(12) United States Patent
Henry et al.

(10) Patent No.: US 8,827,599 B2
(45) Date of Patent: Sep. 9, 2014

(54) CUTTING INSERT ASSEMBLY AND COMPONENTS THEREOF

(71) Applicant: Kennametal Inc., Latrobe, PA (US)

(72) Inventors: Nicholas J. Henry, Latrobe, PA (US);
Shi Chen, North Huntingdon, PA (US);
Kent P. Mizgalski, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 161 days.

(21) Appl. No.: 13/664,568

(22) Filed: Oct. 31, 2012

(65) Prior Publication Data
US 2013/0051934 A1    Feb. 28, 2013

Related U.S. Application Data

(63) Continuation-in-part of application No. 12/874,591, filed on Sep. 2, 2010.

(51) Int. Cl.
*B23B 27/10* (2006.01)
*B23B 27/16* (2006.01)

(52) U.S. Cl.
CPC ........... *B23B 27/10* (2013.01); *B23B 2200/086* (2013.01); *B23B 2205/16* (2013.01); *B23B 27/164* (2013.01)
USPC ................................ 407/11; 408/57; 407/114

(58) Field of Classification Search
CPC .................................. B23B 27/10; B23C 5/28
USPC ......... 407/11, 113–116, 102–107; 408/56, 57
See application file for complete search history.

(56) References Cited

U.S. PATENT DOCUMENTS

| | | | |
|---|---|---|---|
| 160,161 | A | 2/1875 | Clay |
| 522,588 | A | 7/1894 | Chouteau |
| 1,296,536 | A | 3/1919 | Leech |
| 2,575,239 | A | 11/1951 | Stephens |
| 2,677,170 | A | 5/1954 | Kuns et al. |
| 2,870,523 | A | 1/1959 | Richard |
| 3,077,802 | A | 2/1963 | Philip |

(Continued)

FOREIGN PATENT DOCUMENTS

| | | |
|---|---|---|
| DE | 3004166 C2 | 2/1980 |
| DE | 3429842 A1 | 2/1986 |

(Continued)

OTHER PUBLICATIONS

A.S.T.M. Tool Engineers Handbook McGraw Hill Book Co. New York, NY (1949) pp. 302-315.

(Continued)

*Primary Examiner* — Andrea Wellington
*Assistant Examiner* — Sara Addisu
(74) *Attorney, Agent, or Firm* — Larry R. Meenan, Esq.

(57) ABSTRACT

A cutting assembly that includes a holder containing a coolant delivery passage, and a locking pin, which has a longitudinal locking pin bore in communication with the coolant delivery passage. A clamp assembly attaches to the holder and engages a cutting insert. The clamp assembly has a diverter plate with an integral boss, which has a central boos bore, and an interior passage wherein the central boss bore is in communication with the interior passage. The longitudinal locking pin bore opens to the central boss bore whereby coolant flows into the central boss bore and to the interior passage exiting the interior passage toward the cutting insert.

18 Claims, 19 Drawing Sheets

(56) References Cited

U.S. PATENT DOCUMENTS

| | | | |
|---|---|---|---|
| 3,293,727 A | 12/1966 | Simms | |
| 3,323,195 A | 6/1967 | Vanderjagt | |
| 3,364,800 A | 1/1968 | Benjamin et al. | |
| 3,429,700 A | 2/1969 | Wiegand et al. | |
| 3,486,378 A | 12/1969 | Carlson | |
| 3,571,877 A | 3/1971 | Zerkle | |
| 3,798,725 A | 3/1974 | Hanson | |
| 3,798,726 A | 3/1974 | Dudley | |
| 3,889,520 A | 6/1975 | Stoferle et al. | |
| 3,971,114 A | 7/1976 | Dudley | |
| 4,012,061 A | 3/1977 | Olson | |
| 4,123,194 A | 10/1978 | Cave | |
| 4,204,787 A | 5/1980 | McCray et al. | |
| 4,276,085 A | 6/1981 | Wisell | |
| 4,340,324 A | 7/1982 | McCreery | |
| 4,437,800 A | 3/1984 | Araki et al. | |
| 4,535,216 A | 8/1985 | Cassidenti | |
| 4,579,488 A | 4/1986 | Griffin | |
| 4,621,547 A | 11/1986 | Yankoff | |
| 4,682,916 A | 7/1987 | Briese | |
| 4,695,208 A | 9/1987 | Yankoff | |
| 4,757,307 A | 7/1988 | Keramati et al. | |
| 4,813,831 A | 3/1989 | Reinauer | |
| 4,848,198 A | 7/1989 | Royal et al. | |
| 4,861,203 A | 8/1989 | Bassett et al. | |
| 4,880,461 A | 11/1989 | Uchida | |
| 4,880,755 A | 11/1989 | Mehrotra | |
| 4,881,431 A | 11/1989 | Bieneck | |
| 4,955,264 A | 9/1990 | Ambrust | |
| 5,024,976 A | 6/1991 | Mehrotra et al. | |
| 5,148,728 A | 9/1992 | Mazurkiewicz | |
| 5,163,790 A | 11/1992 | Vig | |
| RE34,180 E | 2/1993 | Nemeth et al. | |
| 5,222,843 A | 6/1993 | Katbi et al. | |
| 5,237,894 A | 8/1993 | Lindeke | |
| 5,252,119 A | 10/1993 | Nishida et al. | |
| 5,265,985 A | 11/1993 | Boppana et al. | |
| 5,275,633 A | 1/1994 | Johansson et al. | |
| 5,288,186 A | 2/1994 | Kovacevic | |
| 5,290,135 A | 3/1994 | Ball et al. | |
| 5,316,323 A | 5/1994 | Jovanovic | |
| 5,333,520 A | 8/1994 | Fischer et al. | |
| 5,340,242 A | 8/1994 | Armbrust et al. | |
| 5,346,335 A | 9/1994 | Harpaz et al. | |
| 5,388,487 A | 2/1995 | Danielsen | |
| 5,439,327 A | 8/1995 | Wertheim | |
| D363,076 S | 10/1995 | Hansson et al. | |
| D364,178 S | 11/1995 | Hansson et al. | |
| D369,362 S | 4/1996 | Pantzar et al. | |
| 5,516,242 A | 5/1996 | Andronica | |
| 5,525,134 A | 6/1996 | Mehrotra | |
| 5,542,792 A | 8/1996 | Krueger et al. | |
| 5,554,338 A | 9/1996 | Sugihara et al. | |
| 5,565,156 A | 10/1996 | Ingelstrom | |
| 5,584,616 A | 12/1996 | Katbi et al. | |
| 5,707,185 A | 1/1998 | Mizutani | |
| 5,709,508 A | 1/1998 | Barazani et al. | |
| 5,718,156 A | 2/1998 | Lagrolet et al. | |
| 5,733,075 A | 3/1998 | Basteck | |
| 5,738,468 A | 4/1998 | Boianjiu | |
| 5,761,974 A | 6/1998 | Wang et al. | |
| 5,775,854 A | 7/1998 | Wertheim | |
| 5,799,553 A | 9/1998 | Billatos | |
| 5,816,753 A | 10/1998 | Hall | |
| 5,826,469 A | 10/1998 | Haradem | |
| 5,829,331 A | 11/1998 | Mori | |
| 5,901,623 A * | 5/1999 | Hong | 82/50 |
| 5,904,452 A | 5/1999 | Kress | |
| 5,955,186 A | 9/1999 | Grab | |
| 5,975,817 A | 11/1999 | Komine | |
| 6,010,283 A | 1/2000 | Heinrich et al. | |
| 6,045,300 A | 4/2000 | Antoun | |
| 6,050,752 A | 4/2000 | DeRoche | |
| 6,050,756 A | 4/2000 | Bucholz et al. | |
| 6,053,669 A | 4/2000 | Lageberg | |
| 6,056,486 A | 5/2000 | Colvin | |
| 6,117,533 A | 9/2000 | Inspektor | |
| 6,124,040 A | 9/2000 | Kolaska et al. | |
| 6,164,169 A | 12/2000 | Goff | |
| 6,287,058 B1 | 9/2001 | Arai et al. | |
| 6,287,682 B1 | 9/2001 | Grab et al. | |
| 6,299,388 B1 | 10/2001 | Slabe | |
| 6,302,004 B1 | 10/2001 | Taylor | |
| 6,312,199 B1 | 11/2001 | Sjoden et al. | |
| 6,322,746 B1 | 11/2001 | LaSalle et al. | |
| 6,350,510 B1 | 2/2002 | Konig et al. | |
| 6,394,709 B1 | 5/2002 | Sjoo et al. | |
| 6,443,672 B1 | 9/2002 | Lagerberg | |
| 6,447,218 B1 * | 9/2002 | Lagerberg | 407/114 |
| 6,447,890 B1 | 9/2002 | Leverenz et al. | |
| 6,450,738 B1 | 9/2002 | Ripley | |
| 6,471,448 B1 | 10/2002 | Lagerberg | |
| 6,521,349 B1 | 2/2003 | Konig et al. | |
| 6,528,171 B1 | 3/2003 | Endler et al. | |
| 6,551,551 B1 | 4/2003 | Gegel et al. | |
| 6,575,672 B1 | 6/2003 | Maier | |
| 6,595,727 B2 | 7/2003 | Arvidsson | |
| 6,634,835 B1 | 10/2003 | Smith | |
| 6,637,984 B2 | 10/2003 | Murakawa et al. | |
| 6,648,565 B2 | 11/2003 | Schweizer | |
| 6,652,200 B2 | 11/2003 | Kraemer | |
| 6,705,805 B2 | 3/2004 | Lagerberg | |
| 6,708,590 B2 | 3/2004 | Lagerberg | |
| 6,769,335 B2 | 8/2004 | Kaminski | |
| D496,950 S | 10/2004 | Waggle et al. | |
| D497,923 S | 11/2004 | Waggle et al. | |
| 6,860,172 B2 | 3/2005 | Hecht | |
| 6,884,499 B2 | 4/2005 | Penich et al. | |
| 6,905,992 B2 | 6/2005 | Mehrotra | |
| 6,913,428 B2 | 7/2005 | Kress et al. | |
| 6,957,933 B2 * | 10/2005 | Pachao-Morbitzer et al. | 407/11 |
| 6,988,858 B2 | 1/2006 | Gates, Jr. et al. | |
| 6,998,173 B2 | 2/2006 | Liu et al. | |
| 7,094,717 B2 | 8/2006 | Yeckley | |
| 7,125,205 B2 | 10/2006 | Sheffler | |
| 7,125,207 B2 | 10/2006 | Craig et al. | |
| D535,312 S | 1/2007 | Simpson, III | |
| 7,160,062 B2 | 1/2007 | Tran | |
| 7,252,024 B2 | 8/2007 | Zurecki et al. | |
| 7,273,331 B2 | 9/2007 | Giannetti | |
| 7,275,896 B2 | 10/2007 | Nudelman | |
| D555,684 S | 11/2007 | Waggle et al. | |
| 7,309,466 B2 | 12/2007 | Heinrich et al. | |
| 7,396,191 B2 | 7/2008 | Fujimoto et al. | |
| 7,407,348 B2 | 8/2008 | Sjogren et al. | |
| 7,510,352 B2 | 3/2009 | Craig | |
| 7,530,769 B2 | 5/2009 | Kress et al. | |
| 7,568,864 B2 | 8/2009 | Sjoo | |
| 7,611,310 B2 | 11/2009 | Isaksson | |
| 7,621,700 B2 * | 11/2009 | Jonsson et al. | 407/114 |
| 7,634,957 B2 | 12/2009 | Ghosh et al. | |
| 7,637,187 B2 | 12/2009 | Zurecki et al. | |
| 7,641,422 B2 | 1/2010 | Berminge et al. | |
| 7,665,933 B2 | 2/2010 | Nagaya et al. | |
| 7,687,156 B2 | 3/2010 | Fang et al. | |
| 7,883,299 B2 | 2/2011 | Prichard et al. | |
| 7,883,300 B1 | 2/2011 | Simpson, III et al. | |
| 7,909,546 B2 | 3/2011 | Nada et al. | |
| 7,914,240 B2 | 3/2011 | Baker et al. | |
| 7,934,891 B2 | 5/2011 | Jonsson et al. | |
| 7,955,032 B2 | 6/2011 | Nelson | |
| 7,959,384 B2 | 6/2011 | Breisch | |
| 7,963,729 B2 | 6/2011 | Prichard et al. | |
| 7,997,832 B2 | 8/2011 | Prichard et al. | |
| 8,047,748 B2 | 11/2011 | Endres | |
| 8,057,130 B2 | 11/2011 | Prichard et al. | |
| 8,057,132 B2 | 11/2011 | Johansson et al. | |
| 8,061,241 B2 | 11/2011 | Rozzi et al. | |
| 8,079,783 B2 | 12/2011 | Prichard et al. | |
| 8,092,123 B2 | 1/2012 | Prichard et al. | |
| 8,137,034 B2 | 3/2012 | Noureddine | |
| 8,202,025 B2 | 6/2012 | Prichard et al. | |
| 8,215,878 B2 | 7/2012 | Rozzi et al. | |
| 8,256,998 B2 | 9/2012 | Prichard et al. | |

(56) References Cited

U.S. PATENT DOCUMENTS

| | | | |
|---|---|---|---|
| 8,256,999 | B2 | 9/2012 | Prichard et al. |
| 8,277,150 | B2 | 10/2012 | Watanabe et al. |
| 8,454,274 | B2 * | 6/2013 | Chen et al. .............. 407/11 |
| 2001/0007215 | A1 | 7/2001 | Murata et al. |
| 2001/0014259 | A1 | 8/2001 | Inayama |
| 2002/0106250 | A1 | 8/2002 | Murakawa et al. |
| 2002/0189413 | A1 | 12/2002 | Zurecki et al. |
| 2003/0017014 | A1 | 1/2003 | Morgulis et al. |
| 2003/0082018 | A1 | 5/2003 | Kraemer |
| 2003/0095841 | A1 | 5/2003 | Kraemer |
| 2004/0240949 | A1 | 12/2004 | Pachao-Morbitzer et al. |
| 2005/0186039 | A1 | 8/2005 | Muller et al. |
| 2006/0053987 | A1 | 3/2006 | Ghosh |
| 2006/0140728 | A1 | 6/2006 | Giannetti |
| 2006/0171837 | A1 | 8/2006 | Heinrich et al. |
| 2006/0263153 | A1 | 11/2006 | Isaksson |
| 2007/0160432 | A1 | 7/2007 | Eder et al. |
| 2007/0283794 | A1 | 12/2007 | Giannetti |
| 2007/0286689 | A1 | 12/2007 | Giannetti |
| 2008/0175676 | A1 | 7/2008 | Prichard |
| 2008/0175677 | A1 | 7/2008 | Prichard et al. |
| 2008/0175678 | A1 | 7/2008 | Prichard |
| 2008/0175679 | A1 | 7/2008 | Prichard |
| 2008/0199263 | A1 | 8/2008 | Jonsson et al. |
| 2010/0254772 | A1 | 10/2010 | Rozzi et al. |
| 2011/0070037 | A1 | 3/2011 | Baker et al. |
| 2011/0299944 | A1 * | 12/2011 | Hofermann .............. 407/11 |
| 2011/0305531 | A1 | 12/2011 | Amstibovitsky et al. |
| 2011/0311323 | A1 | 12/2011 | Hecht |
| 2012/0087747 | A1 | 4/2012 | Fang et al. |
| 2012/0230780 | A1 | 9/2012 | Henry et al. |

FOREIGN PATENT DOCUMENTS

| | | |
|---|---|---|
| DE | 3740814 A1 | 12/1987 |
| EP | 100376 A2 | 2/1984 |
| EP | 0599393 B1 | 2/1996 |
| EP | 791420 A1 | 8/1997 |
| EP | 0932460 B1 | 6/2003 |
| FR | 1279749 | 1/1961 |
| FR | 2244590 | 9/1973 |
| JP | 5669007 A2 | 6/1981 |
| JP | 60127904 A | 7/1985 |
| JP | 04183503 A2 | 6/1992 |
| JP | 05301104 | 11/1993 |
| JP | 06254704 | 9/1994 |
| JP | 06083205 U | 11/1994 |
| JP | 07227702 A2 | 8/1995 |
| JP | 07237006 | 9/1995 |
| JP | 08025111 A | 1/1996 |
| JP | 08039387 | 2/1996 |
| JP | 08039387 A | 2/1996 |
| JP | 09262706 A | 10/1997 |
| JP | 10094904 A2 | 4/1998 |
| JP | 2000280106 A | 10/2000 |
| JP | 2001113408 A | 4/2001 |
| JP | 2001239420 A | 9/2001 |
| JP | 2001287103 | 10/2001 |
| JP | 2002346810 | 12/2002 |
| JP | 2003053622 A | 2/2003 |
| JP | 2003266207 A2 | 9/2003 |
| JP | 2003266208 A2 | 9/2003 |
| JP | 2004122262 A | 4/2004 |
| JP | 2005279900 A2 | 10/2005 |
| JP | 2006055916 A * | 3/2006 |
| JP | 06136953 A | 6/2006 |
| JP | 2007044834 | 2/2007 |
| KR | 1020060027154 A | 3/2006 |
| KR | 1020060054916 A | 5/2006 |
| KR | 1020090094250 | 9/2009 |
| SU | 1217585 A1 | 3/1986 |
| WO | 9830349 A1 | 7/1998 |
| WO | 0076697 A2 | 12/2000 |
| WO | 0158632 A1 | 8/2001 |
| WO | 2010079472 A1 | 7/2010 |
| WO | 2010096014 A1 | 8/2010 |

OTHER PUBLICATIONS

Moltrecht, K.H. Machine Shop Practice, Industrial Press Inc. New York, NY (1981) pp. 199-204.

Santhanam et al. "Cemented Carbides", Metals Handbook, vol. 2, 10th Edition, Properties and Selection, ASM International (1990) pp. 950-977.

Wertheim et al., "Influence of High-Pressure Flushing through the Rake Face of a Cutting Tool", Annuals of the CIRP, vol. 41/1 (1992) pp. 101-106.

PCT/US2011/046986 Notification of Transmittal of International Search Report and Written Opinion, (2 pages) mailed Mar. 23, 2012.

PCT/US2011/046986 International Search Report, (4 pages) mailed Mar. 23, 2012.

PCT/US2011/046986 Written Opinion (5 pages) mailed Mar. 23, 2012.

PCT/US2011/046985 International Search Report (3 pages), mailed Mar. 28, 2012.

PCT/US2011/046985 Notification of Transmittal of International Search Report and Written Opinion (2 pages), mailed Mar. 28, 2012.

PCT/US2011/046985 Written Opinion (5 pages), mailed Mar. 28, 2012.

* cited by examiner

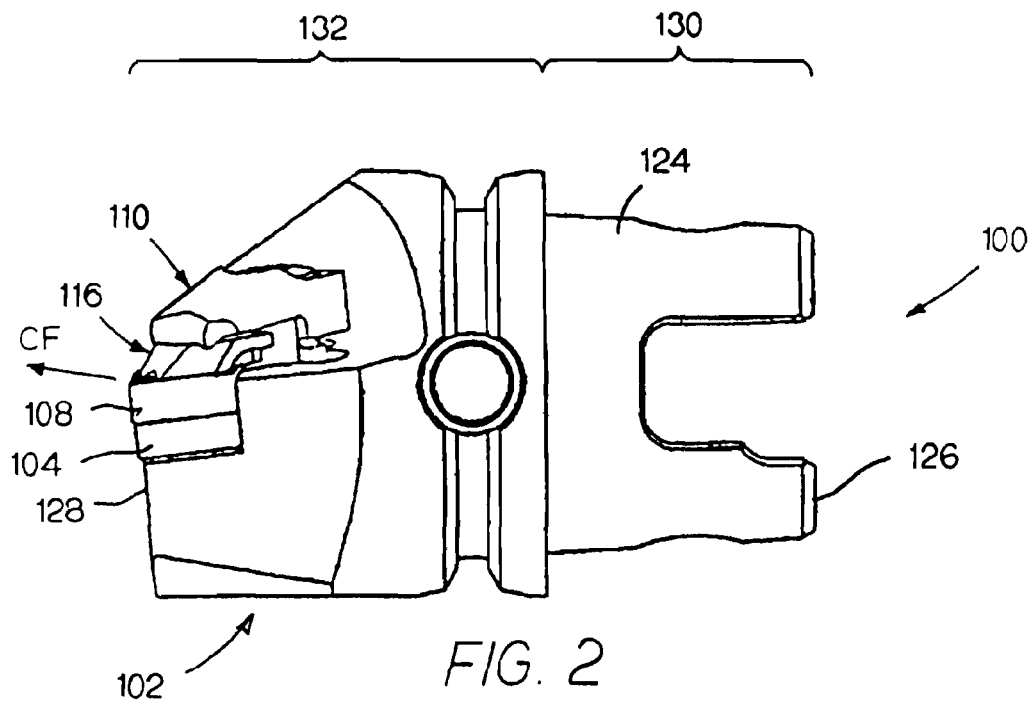
FIG. 2
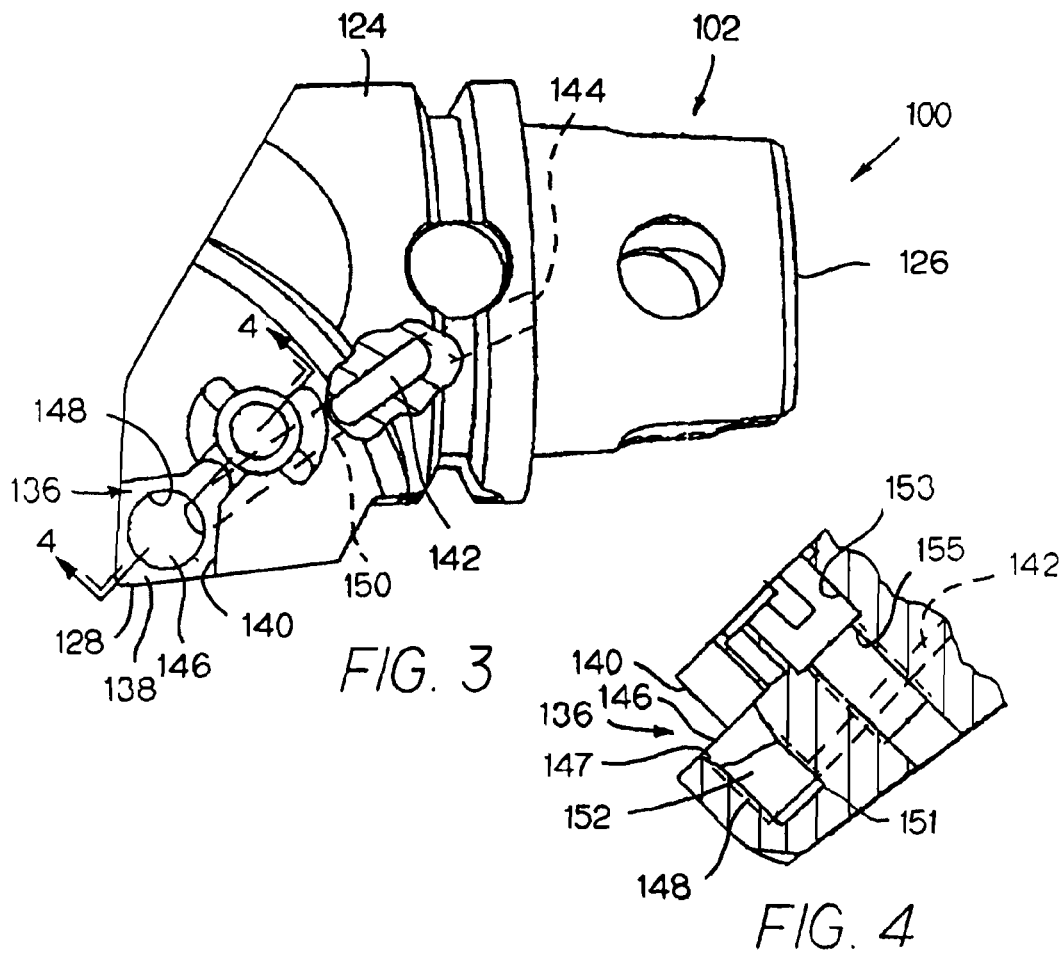
FIG. 3
FIG. 4

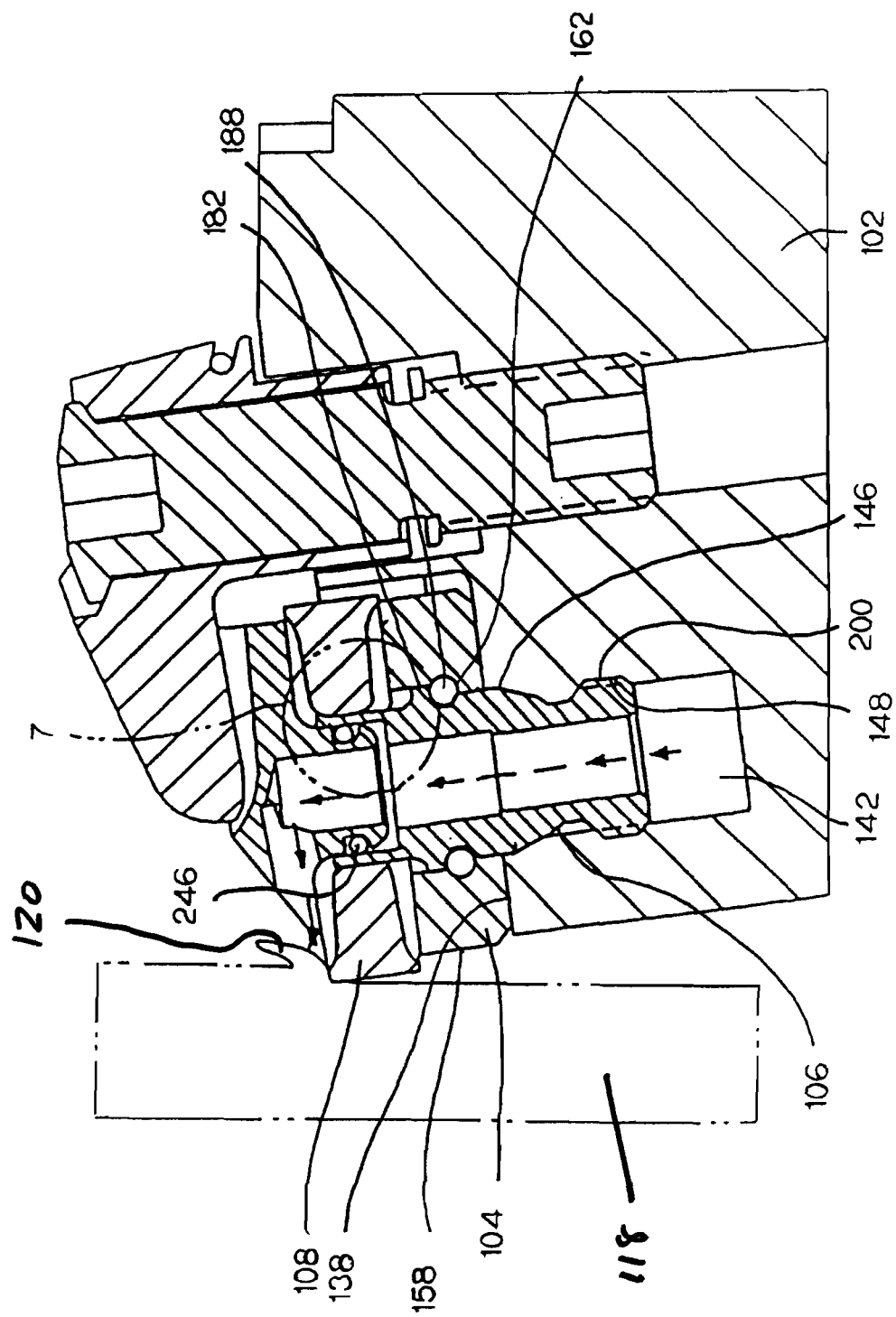

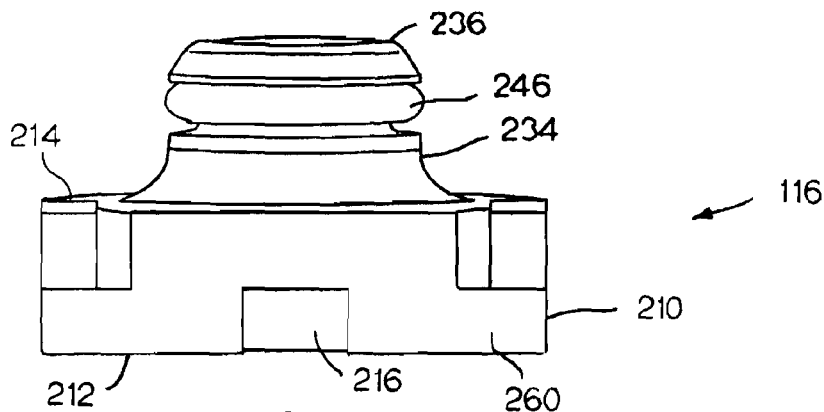
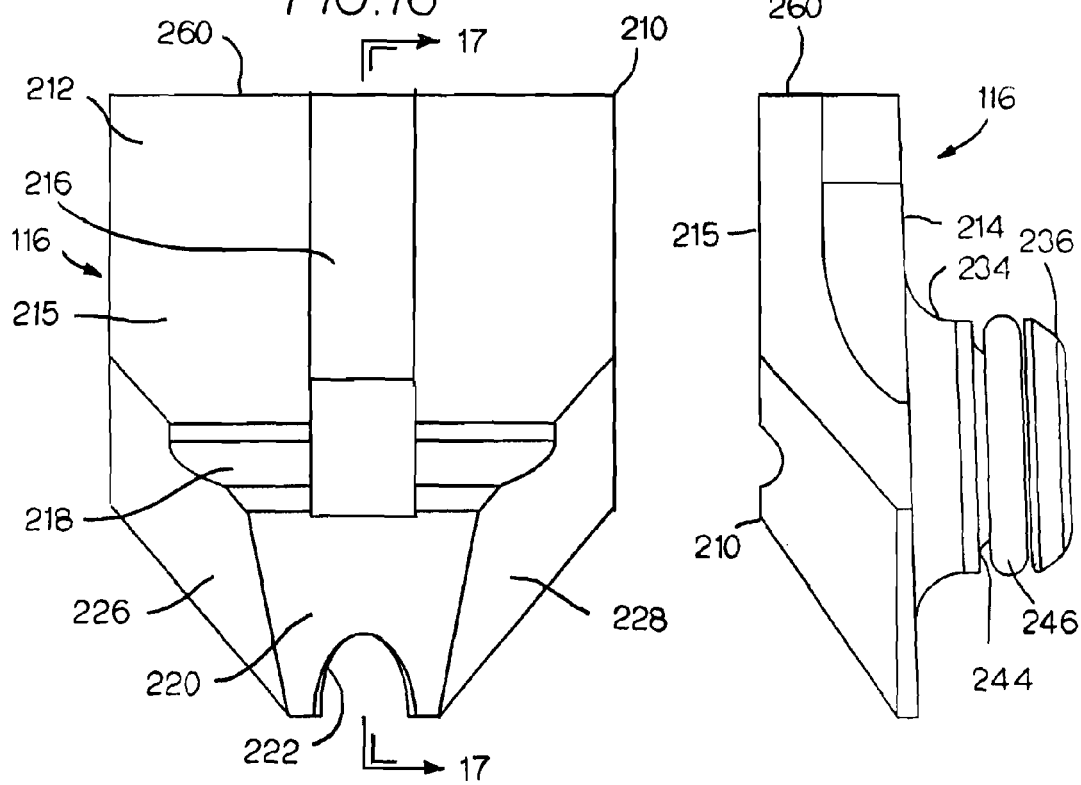
FIG.16
FIG.14
FIG.15

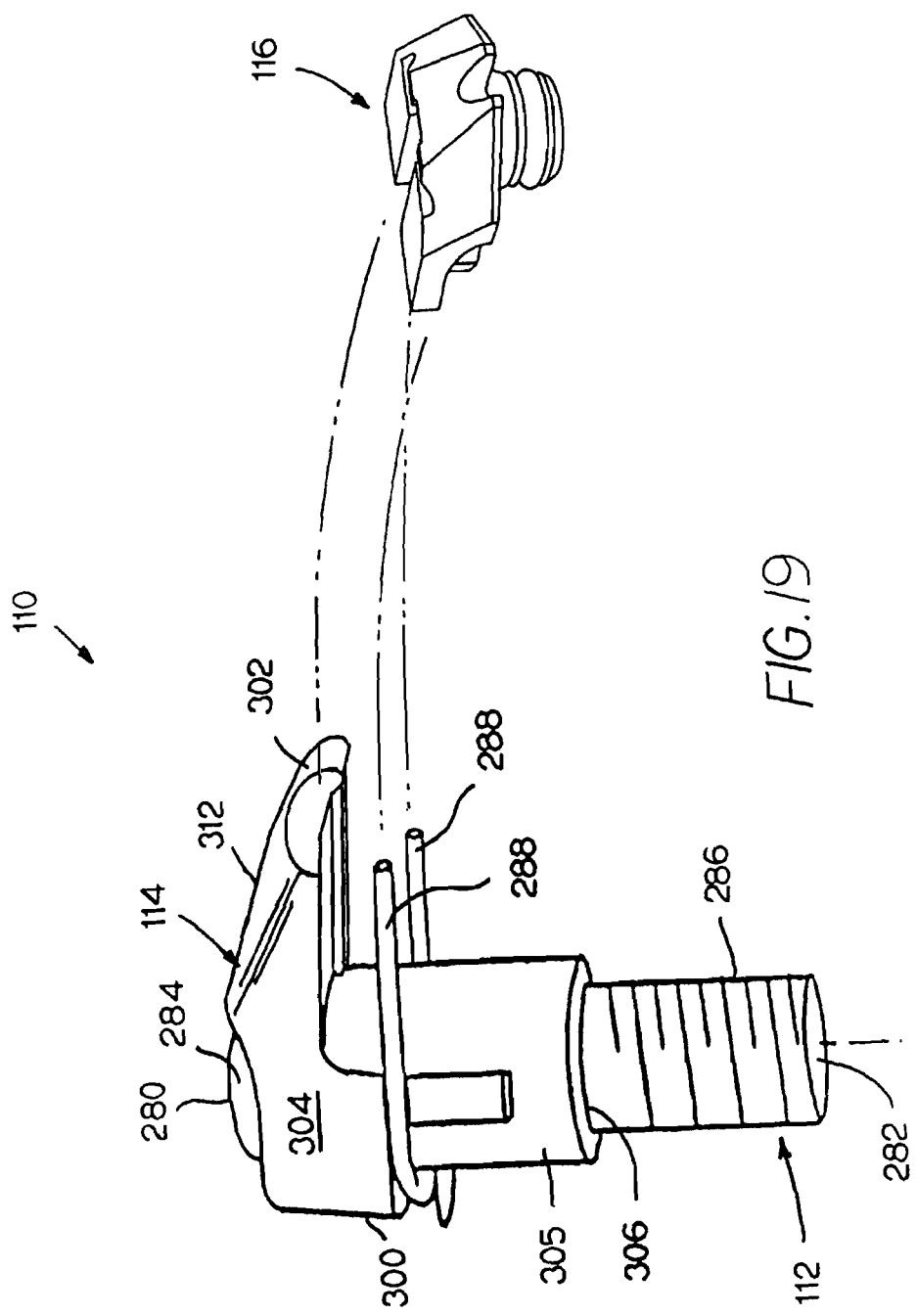

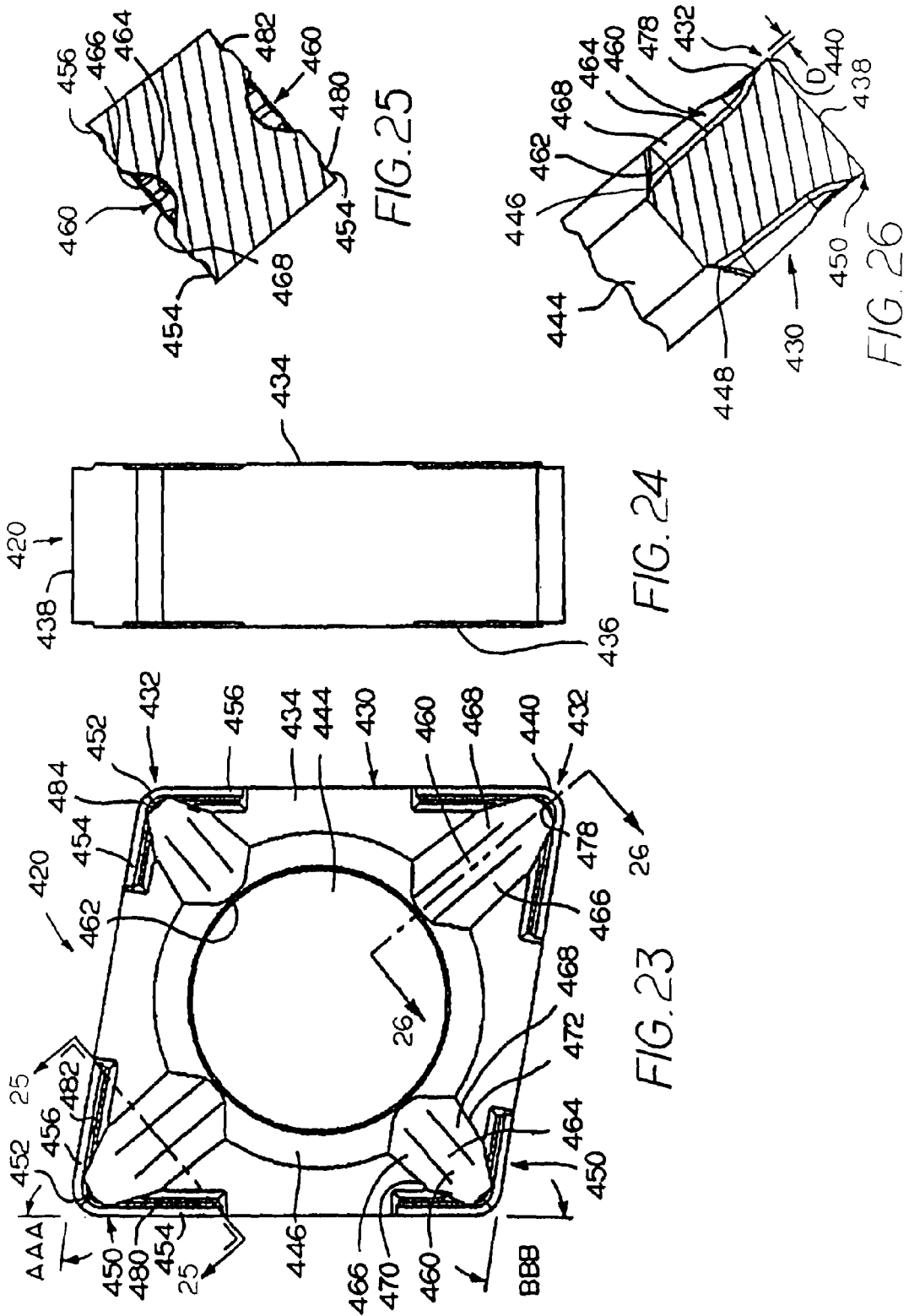

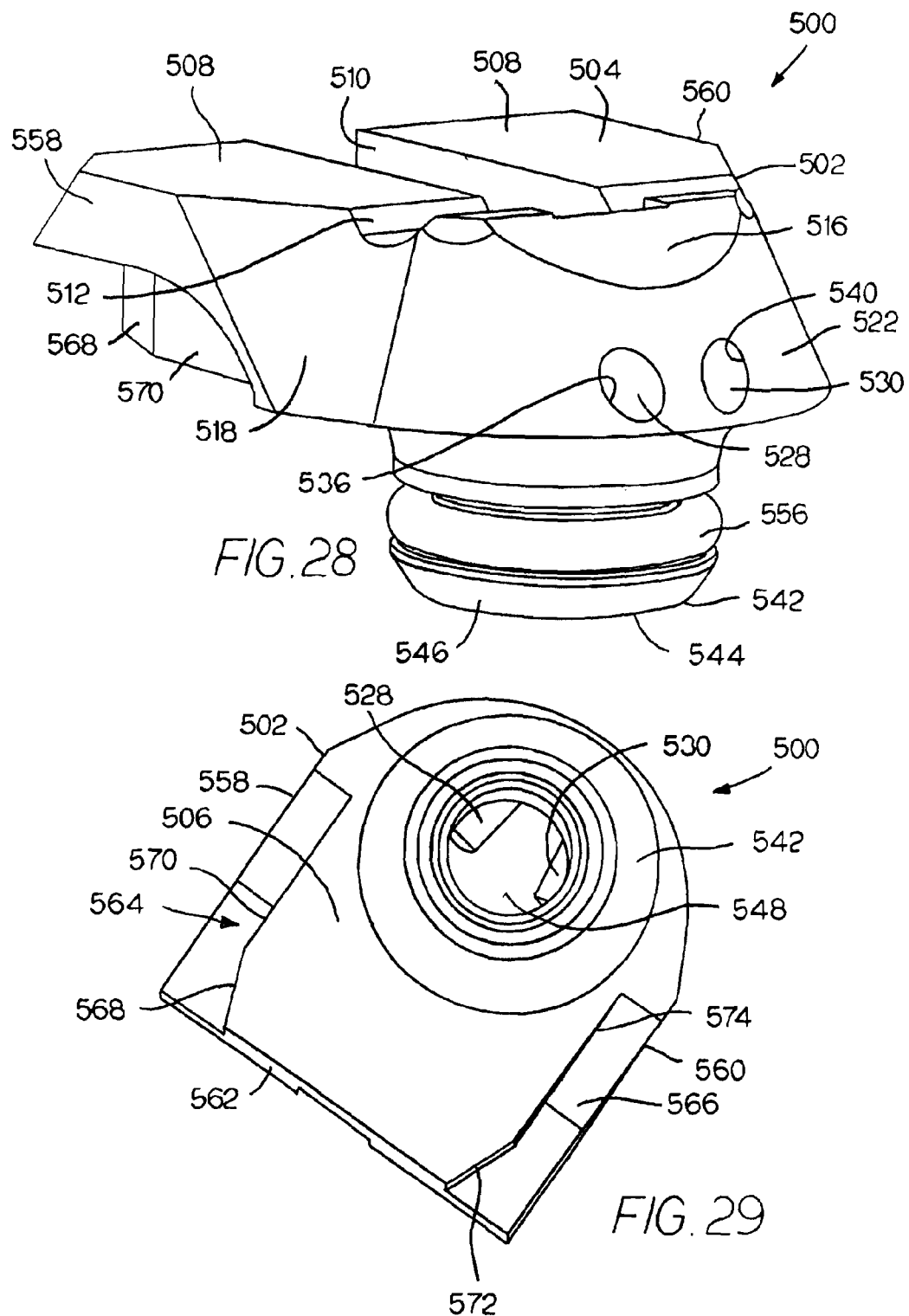

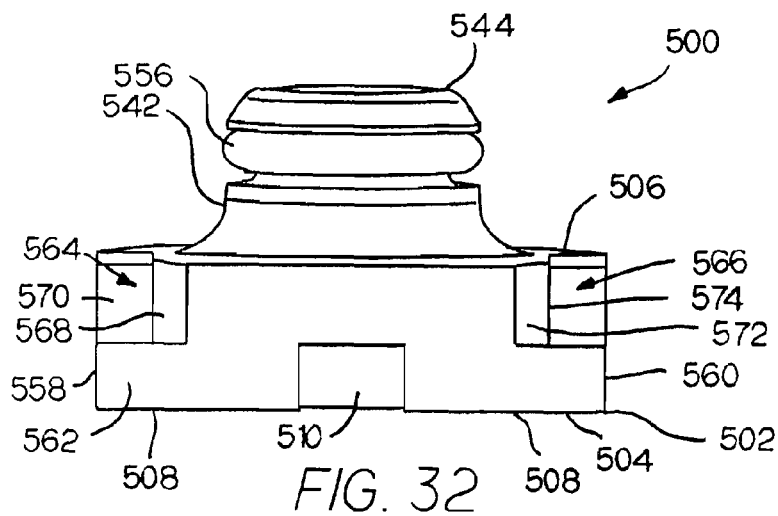
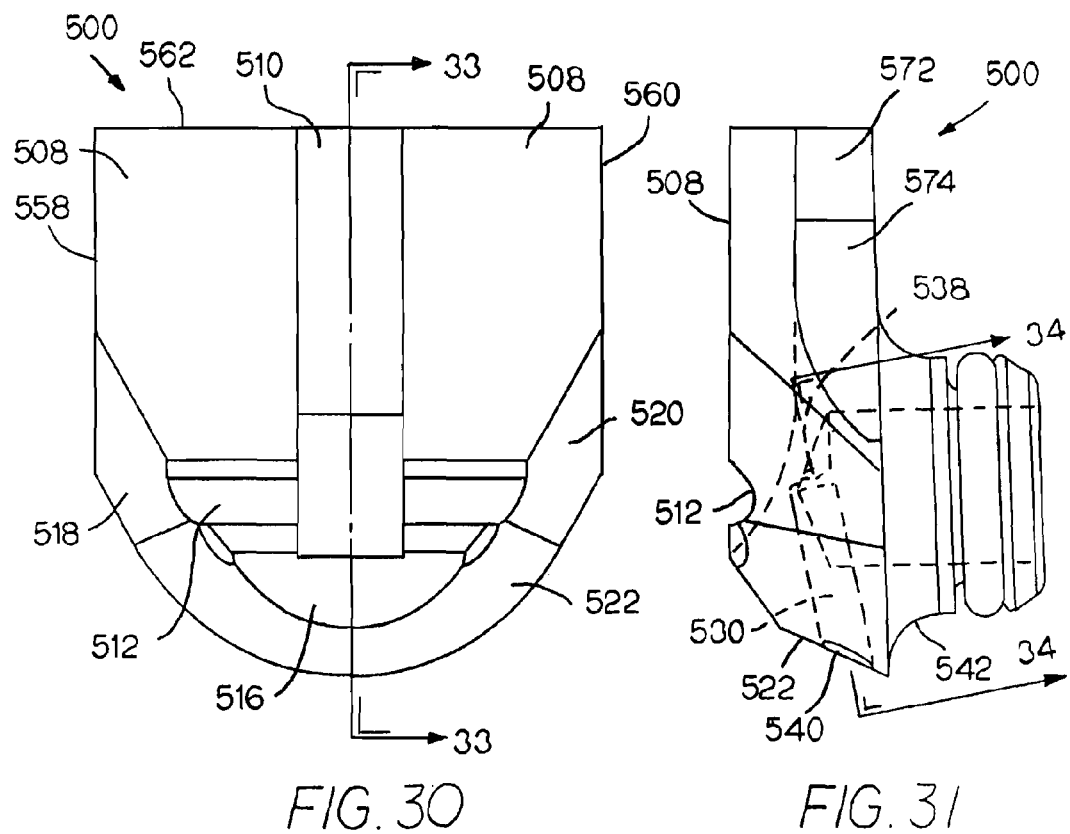
FIG. 32
FIG. 30
FIG. 31

US 8,827,599 B2

CUTTING INSERT ASSEMBLY AND COMPONENTS THEREOF

CROSS-REFERENCE TO EARLIER PATENT APPLICATIONS

This patent applications is a continuation-in-part of pending U.S. patent application Ser. No. 12/874,591 filed on Sep. 2, 2010 by Chen et al. for CUTTING INSERT ASSEMBLY AND COMPONENTS THEREOF. Applicants hereby claim priority based upon said U.S. patent application Ser. No. 12/874,591 filed on Sep. 2, 2010 by Chen et al. for CUTTING INSERT ASSEMBLY AND COMPONENTS THEREOF. Further, applicants hereby incorporate herein in its entirety such U.S. patent application Ser. No. 12/874,591 filed on Sep. 2, 2010 by Chen et al. for CUTTING INSERT ASSEMBLY AND COMPONENTS THEREOF.

BACKGROUND OF THE INVENTION

The subject invention is directed to metal cutting system and, in particular, to a metal cutting system adapted to facilitate enhanced delivery of coolant adjacent the interface between the cutting insert and the workpiece (i.e., the insert-chip interface) to diminish excessive heat at the insert-chip interface in the chipforming removal of material from a workpiece. The subject invention is directed further to components of such metal cutting systems. Such components include, for example, a locking pin, a clamp assembly, a holder, a shim and a cutting insert.

Metal cutting tools for performing metal working operations generally comprise a cutting insert having a surface terminating at a cutting edge and a tool holder formed with a seat adapted to receive the insert. The cutting insert engages a workpiece to remove material, and in the process forms chips of the material. Excessive heat at the insert-chip interface can negatively impact upon (i.e., reduce or shorten) the useful tool life of the cutting insert.

For example, a chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. A flow of coolant to the insert-chip interface will reduce the potential for such welding. It would therefore be desirable to reduce excessive heat at the insert-chip interface to eliminate or reduce build up of chip material.

As another example, in a chipforming material removal operation, there can occur instances in which the chips do not exit the region of the insert-chip interface when the chip sticks to the cutting insert. When a chip does not exit the region of the insert-chip interface, there is the potential that a chip can be re-cut. It is undesirable for the turning insert to re-cut a chip already removed from the workpiece. A flow of coolant to the insert-chip interface will facilitate the evacuation of chips from the insert-chip interface thereby minimizing the potential that a chip will be re-cut.

There is an appreciation that a shorter useful tool life increases operating costs and decreases overall production efficiency. Excessive heat at the insert-chip interface contribute to the welding of chip material and re-cutting of chips, both of which are detrimental to production efficiency. There are readily apparent advantages connected with decreasing the heat at the insert-chip interface wherein one way to decrease the temperature is to supply coolant to the insert-chip interface.

Heretofore, systems operate to lower the cutting insert temperature during cutting. For example, some systems use external nozzles to direct coolant at the cutting edge of the insert. The coolant serves not only to lower the temperature of the insert but also to remove the chip from the cutting area. The nozzles are often a distance of one to twelve inches away from the cutting edge. This is too far of a distance for effective cooling. The farther the coolant must travel, the more the coolant will mix with air and the less likely it will be to contact the tool-chip interface.

U.S. Pat. No. 6,053,669 to Lagerberg for CHIP FORMING CUTTING INSERT WITH INTERNAL COOLING discusses the importance of reducing the heat at the insert-chip interface. Lagerberg mentions that when the cutting insert made from cemented carbide reaches a certain temperature, its resistance to plastic deformation decreases. A decrease in plastic deformation resistance increases the risk for breakage of the cutting insert. U.S. Pat. No. 5,775,854 to Wertheim for METAL CUTTING TOOL points out that a rise in the working temperature leads to a decrease in hardness of the cutting insert. The consequence is an increase in wear of the cutting insert.

Other patent documents disclose various ways to or systems to deliver coolant to the insert-chip interface. For example, U.S. Pat. No. 7,625,157 to Prichard et al. for MILLING CUTTER AND MILLING INSERT WITH COOLANT DELIVERY pertains to a cutting insert that includes a cutting body with a central coolant inlet. The cutting insert further includes a positionable diverter. The diverter has a coolant trough, which diverts coolant to a specific cutting location.

U.S. Pat. No. 6,045,300 to Antoun for TOOL HOLDER WITH INTEGRAL COOLANT PASSAGE AND REPLACEABLE NOZZLE discloses using high pressure and high volume delivery of coolant to address heat at the insert-chip interface. U.S. Pat. No. 6,652,200 to Kraemer for a TOOL HOLDER WITH COOLANT SYSTEM discloses grooves between the cutting insert and a top plate. Coolant flows through the grooves to address the heat at the insert-chip interface. U.S. Pat. No. 5,901,623 to Hong for CRYOGENIC MACHINING discloses a coolant delivery system for applying liquid nitrogen to the insert-chip interface.

SUMMARY OF THE INVENTION

The inventor(s) have recognized the problems associated with conventional cooling apparatus and have developed an insert assembly that works with a conventional coolant system to deliver coolant to a cutting insert that addresses the problems of the prior In one form thereof, the invention is a cutting assembly for use in an operation for chipforming removal of material from a workpiece. The cutting assembly comprises a holder that has a seat and the holder contains a coolant delivery passage. The cutting assembly further has a locking pin, which has a longitudinal locking pin bore wherein the locking pin is affixed to the seat so the longitudinal locking pin bore is in communication with the coolant delivery passage. There is a cutting insert that has a central cutting insert aperture. At least a portion of the locking pin is within the central cutting insert aperture. There is a clamp assembly that is attached to the holder and engages the cutting insert. The clamp assembly has a diverter plate wherein the diverter plate has a bottom surface with an integral boss depending away from the bottom surface of the diverter plate. The integral boss contains a central boss bore. The diverter plate contains an interior passage wherein the central boss bore is in communication with the interior passage. The longitudinal locking pin bore opens to the central boss bore whereby coolant flows into the central boss bore and to the interior passage exiting the interior passage toward the cutting insert.

In another form thereof, the invention is a locking pin-diverter plate assembly for use with a holder having a coolant delivery passage, a cutting insert, and a clamp. The locking pin-diverter plate assembly comprises a locking pin that contains a longitudinal locking pin bore that has a coolant inlet and a coolant outlet. The longitudinal locking pin bore has an upper portion defined by an upper interior wall. There is a diverter plate that has a bottom surface with an integral boss depending away from the bottom surface of the diverter plate. The integral boss has a central boss bore. The diverter plate contains an interior passage in communication with the central boss bore. The longitudinal locking pin bore opens to the diverter plate whereby coolant flows into the central boss bore and to the interior passage exiting the interior passage toward the cutting insert.

In yet another form thereof, the invention is a cutting assembly for use in an operation for chipforming removal of material from a workpiece. The cutting assembly comprises a holder that has a seat and contains a coolant delivery passage. There is a locking pin that has a longitudinal locking pin bore in communication with the coolant delivery passage. There is a cutting insert. A clamp assembly attaches to the holder and engages the cutting insert. The clamp assembly has a diverter plate with an integral boss containing a central boss bore. The diverter plate contains an interior passage wherein the central boss bore is in communication with the interior passage. The integral boss extends into at least a part of the longitudinal locking pin bore. The integral boss carries a resilient seal and the resilient seal provides a fluid-tight seal between the diverter plate and the locking pin. The longitudinal locking pin bore opens to the central boss bore whereby coolant flows into the central boss bore and to the interior passage exiting the interior passage toward the cutting insert.

BRIEF DESCRIPTION OF THE DRAWINGS

The following is a brief description of the drawings that form a part of this patent application:

FIG. 2 is a side view of the specific embodiment of FIG. 1;

FIG. 3 is a top view of the specific embodiment of FIG. 1 but without the cutting insert assembly affixed to the holder, and with a portion of the holder body removed to show the interior coolant passage;

FIG. 4 is a cross-sectional view of the specific embodiment of FIG. 3, which does not have the cutting insert assembly, taken along section line 4-4 of FIG. 3;

FIG. 6 is a cross-sectional schematic view of the specific embodiment of FIG. 5 taken along section line 6-6 of FIG. 5 showing the travel of coolant, as well as the engagement of the workpiece with the cutting insert to generate a chip;

FIG. 14 is a top view of the diverter plate of FIG. 12;

FIG. 15 is a side view of the diverter plate of FIG. 12

FIG. 16 is a rear view of the diverter plate of FIG. 12;

FIG. 19 is an isometric view of the clamp screw with the diverter plate exploded away;

FIG. 23 is a top view of the roughing cutting insert of FIG. 22;

FIG. 24 is a side view of the roughing cutting insert of FIG. 22;

FIG. 25 is a cross-sectional view of the roughing cutting insert of FIG. 23 taken along section line 25-25 of FIG. 23;

FIG. 26 is a cross-sectional view of the roughing cutting insert of FIG. 23 taken along section line 26-26 of FIG. 23;

FIG. 28 is an isometric view of a second specific embodiment of a diverter plate;

FIG. 29 is a bottom isometric view of the diverter plate of FIG. 28;

FIG. 30 is a top view of the diverter plate of FIG. 28;

FIG. 31 is a side view of the diverter plate of FIG. 28;

FIG. 32 is a rear view of the diverter plate of FIG. 28;

DETAILED DESCRIPTION

Figure 1:
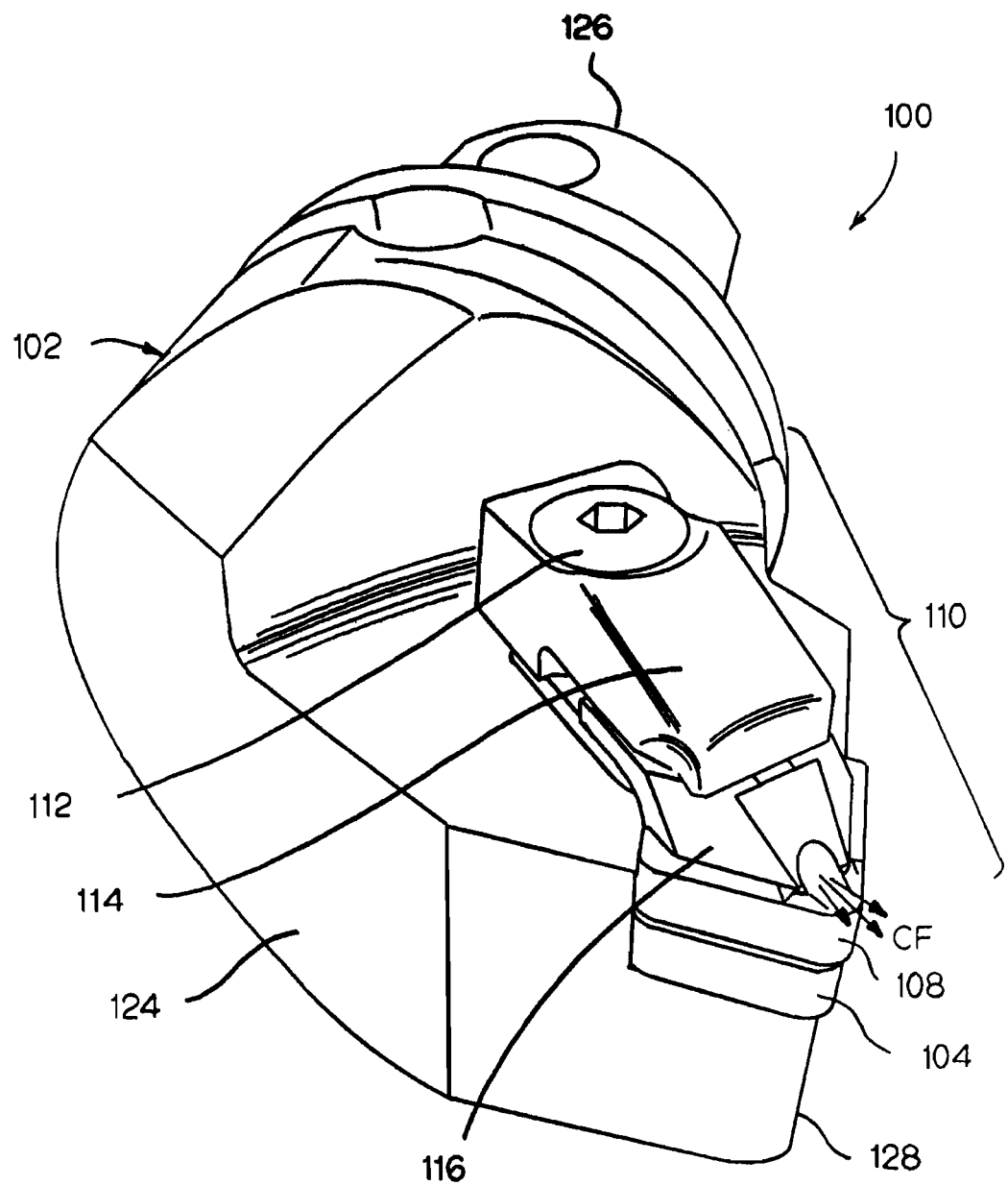
FIG. 1 is an isometric view of a specific embodiment of the cutting assembly, which comprises a holder and a cutting insert assembly
Figure 5:
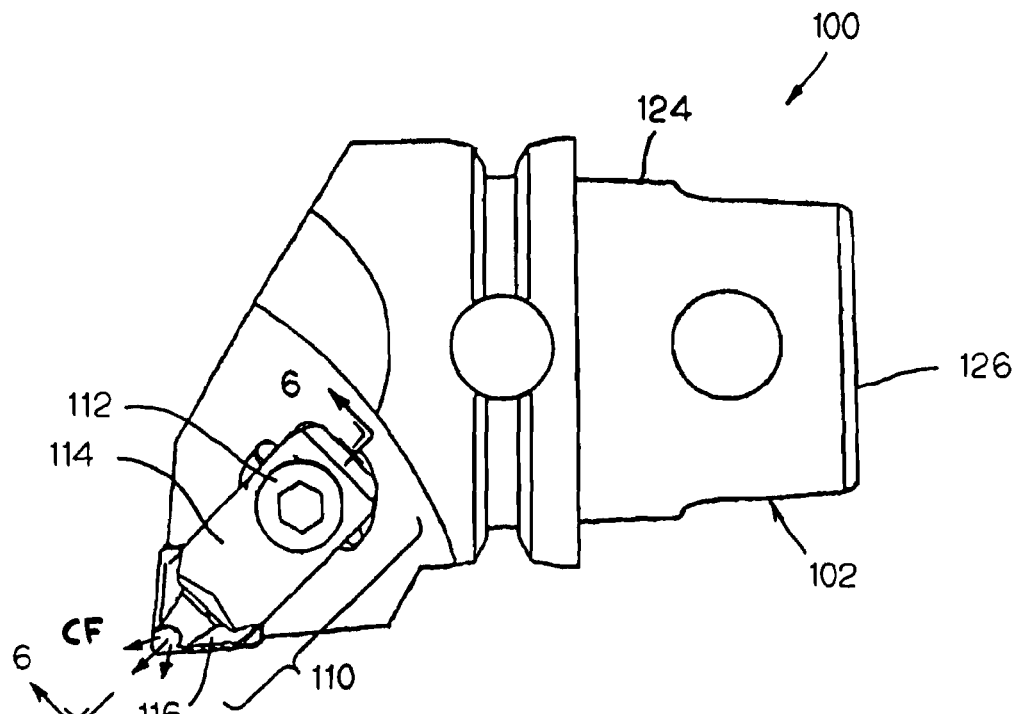
FIG. 5 is a top view of the specific embodiment of FIG. 1 wherein the cutting insert assembly attaches to the holder.

The present invention pertains to a cutting insert assembly useful for a chipforming material removal operation. In a chipforming material removal operation, the cutting insert engages a workpiece to remove material from a workpiece typically in the form of chips. A material removal operation that removes material from the workpiece in the form of chips typically is known by those skilled in the art as a chipforming material removal operation. The book *Machine Shop Practice* [Industrial Press Inc., New York, N.Y. (1981)] by Moltrecht presents at pages 199-204 a description, inter alia, of chip formation, as well as different kinds of chips (i.e., continuous chip, discontinuous chip, segmental chip). Moltrecht reads

[in part] at pages 199-200, "When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . . When the type of metal being cut is ductile, such as steel, the chip will come off in a continuous ribbon . . . ". Moltrecht goes on to describe formation of a discontinuous chip and a segmented chip. As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling. The following patent documents discuss the formation of chips in a material removal operation: U.S. Pat. No. 5,709,907 to Battaglia et al. (assigned to Kennametal Inc.), U.S. Pat. No. 5,722,803 to Battaglia et al. (assigned to Kennametal Inc.), and U.S. Pat. No. 6,161,990 to Oles et al. (assigned to Kennametal Inc.).

In the preferred embodiment, the total flow of all coolant passages should not be less than 80% of the possible flow from an unrestricted flood nozzle. There should be an appreciation that any one of a number of different kinds of fluid or coolant are suitable for use in the cutting insert. Broadly speaking, there are two basic categories of fluids or coolants; namely, oil-based fluids which include straight oils and soluble oils, and chemical fluids which include synthetic and semisynthetic coolants. Straight oils are composed of a base mineral or petroleum oil and often contain polar lubricants such as fats, vegetable oils, and esters, as well as extreme pressure additives of chlorine, sulfur and phosphorus. Soluble oils (also called emulsion fluid) are composed of a base of petroleum or mineral oil combined with emulsifiers and blending agents Petroleum or mineral oil combined with emulsifiers and blending agents are basic components of soluble oils (also called emulsifiable oils). The concentration of listed components in their water mixture is usually between 30-85%. Usually the soaps, wetting agents, and couplers are used as emulsifiers, and their basic role is to reduce the surface tension. As a result they can cause a fluid tendency to foam. In addition, soluble oils can contain oiliness agents such as ester, extreme pressure additives, alkanolamines to provide Òreserve alkalinityÒ, a biocide such as triazine or oxazolidene, a defoamer such as a long chain organic fatty alcohol or salt, corrosion inhibitors, antioxidants, etc. Synthetic fluids (chemical fluids) can be further categorized into two subgroups: true solutions and surface active fluids. True solution fluids are composed essentially of alkaline inorganic and organic compounds and are formulated to impart corrosion protection to water. Chemical surface-active fluids are composed of alkaline inorganic and organic corrosion inhibitors combined with anionic non-ionic wetting agents to provide lubrication and improve wetting ability. Extreme-pressure lubricants based on chlorine, sulfur, and phosphorus, as well as some of the more recently developed polymer physical extreme-pressure agents can be additionally incorporated in this fluid. Semisynthetics fluids(also called semi-chemical) contains a lower amount of refined base oil (5-30%) in the concentrate. They are additionally mixed with emulsifiers, as well as 30-50% of water. Since they include both constituents of synthetic and soluble oils, characteristic properties common to both synthetics and water soluble oils are presented.

Referring to FIG. 1 as well as other appropriate drawings, FIG. 1 is an isometric view that shows a specific embodiment of the cutting assembly generally designated as 100. This is a cutting assembly useful for an operation for chipforming removal of material from a workpiece 118. The material is removed from the workpiece 118 in the form of chips 120. Cutting assembly 100 comprises the basic components of a holder generally designated as 102, which is a style of holder sold by Kennametal Inc., Latrobe, Pa. U.S.A. 15650 under the trademark KM. There should be an appreciation that different styles of holders are suitable for use. The holder 102 should have an internal coolant delivery passageway, which communicates with a coolant source, and a seating region. The seating region has an opening in the seat wherein the opening is in fluid communication with the internal coolant passageway.

The cutting assembly 100 further includes a shim 104, a locking pin 106 (not illustrated in FIG. 1, but shown in FIG. 6 and other drawings), a cutting insert 108, and a clamp assembly (bracket) 110. Each of these components is described in more detail hereinafter. The clamp assembly 110 comprises an upstanding screw 112 and an arm 114, which projects away from the screw 112. A diverter plate 116 detachably connects to the arm 114, wherein at least a portion of the diverter plate 116 projects away from the arm 114 and covers at least a portion of the cutting insert 108.

Arrows CF in FIG. 1 represents the coolant flow spraying or exiting from the cutting assembly. The coolant sprays toward the discrete cutting location where the cutting insert engages the workpiece. As will be described in more detail hereinafter, the coolant spray moves along the radial coolant trough in the rake surface of the cutting insert. The geometry of the radial coolant trough causes the coolant to move in the upward direction away from the rake face and the outward direction away from the central insert aperture. The coolant exits the radial coolant trough in an upward and outward direction. The coolant spray impinges the underneath surface of the chip formed from the workpiece wherein the upward and outward movement of the coolant facilitates the impingement of the chip on the underneath surface thereof.

Referring to FIGS. 2 through 4 as well as other appropriate drawings, the holder 102 has a holder body 124, which has a forward end (or working end) 128 and a rearward end 126. The holder body 124 has a shank region (bracket 130) adjacent the rearward end 126 and a head region (bracket 132) adjacent the forward end 128. The head region 132 includes a seat generally designated as 136, which has a seating surface 138 and an upstanding support surface 140. As will become apparent hereinafter, the upstanding support surface 140 provides support for the shim 104 and the cutting insert 108 when the holder body 124 is secured to the seat 136.

The holder body 124 contains a coolant delivery passage 142, which has one end 144 and an opposite end 146. The opposite end 146 is in the seating surface 138. The coolant delivery passage 142 has a smooth frusto-conical section 147 (see FIG. 4) adjacent the seating surface 138. As illustrated in FIG. 4, the coolant delivery passage 142 further has a threaded section 148 next to the smooth frusto-conical section 147. In reference to the coolant delivery passage 142, the majority of the coolant delivery passage 142 comprises a generally cylindrical conduit 150 that moves from the one end 144 to a point 151 where the coolant delivery passage 142 changes direction. A shorter portion 152 of the coolant delivery passage 142 then travels to the seating surface 138. As illustrated in FIG. 3, coolant enters the coolant delivery passage 142 through the one end 144. The holder body 124 further contains a clamp bore 153 that includes a threaded clamp bore section 155.

Referring to FIGS. 8-11 as well as other appropriate drawings, the locking pin generally designated as 106 has an elongate locking pin body 170, which has an axial top end 172 and an axial bottom end 174. Locking pin body 170 contains a central longitudinal locking pin bore 176 extending all the way through the locking pin body 170. The longitudinal locking pin bore 176 has a coolant inlet 178 and a coolant outlet 180. As will become apparent hereinafter, coolant enters at the coolant inlet 178, travels through the bore 176, and exits at the coolant outlet 180.

The exterior surface of the locking pin body 170 has an annular shoulder 182 mediate of the axial top end 172 and the axial bottom end 174. Rearward of the annular shoulder 182 is an annular groove 183. The locking pin body 170 has a head region (bracket 184) adjacent the top end 172 and includes the annular shoulder 182. The locking pin body 170 further has a shank region (bracket 186) adjacent the bottom end 174. The annular groove 183 in the locking pin body 170 carries a resilient O-ring seal 188. The exterior surface of the locking pin body 170 contains a threaded region 200 adjacent the bottom end 174 thereof.

The locking pin 106 provides for a "pull back" feature upon complete tightening into the threaded section 148 of the coolant delivery passage 142. The locking pin 106 accomplishes this feature by a difference in the orientation of the longitudinal axis of the threaded region 200 as compared to the longitudinal axis of the remainder of the locking pin body 170. The central longitudinal axis of the threaded region 200 and the longitudinal axis of the remainder of the locking pin are disposed apart an angle. By "pull back", it is meant that upon complete tightening of the locking pin 106, the locking pin 106 urges the shim 104 and the cutting insert 108 toward the upstanding support surface 140. This feature enhances the integrity of the holding of the cutting insert 108 and shim 104 in the seat of the holder. This "pull back" feature is illustrated and described in co-pending U.S. patent application Ser. No. 12/874,591 filed on Sep. 2, 2010 by Chen et al. for CUTTING INSERT ASSEMBLY AND COMPONENTS THEREOF, which is incorporated by reference herein.

Referring to FIGS. 12 through 18, there is illustrated a diverter plate 116 that has a main diverter plate body 210. The main diverter plate body 210 has a top surface 212 and a bottom surface 214. The top surface 212 has a level portion 215 in which there is an axial groove 216. The main diverter plate body 210 further contains a transverse groove 218 at the juncture between the level portion 215 and a sloped portion that has a central sloped surface 220 and two lateral sloped surfaces 226, 228. The main diverter plate body 210 contains a notch 222 and an interior passage 224.

The diverter plate 116 further has an integral boss 234 that depends away from the bottom surface 214 of the main diverter plate body 210. The boss 234 has a distal end 236 at which there is a frusto-conical surface 248. The boss 234 further contains a central boss bore 238 that has a bottom end 240 and an upper end 242. The exterior surface of the integral boss 234 contains an annular groove 244 that carries an O-ring seal 246.

The main diverter body 210 further has side surfaces (256, 258) that extend from their respective lateral sloped surfaces (226, 228), respectively, to the rear end surface 260 of the main diverter body 210. Each side surface 256, 258 contains a lateral groove 264, 266, respectively. Lateral groove 264 is defined a part by a tapered wall 268 and a straight wall 270. Lateral groove 266 is defined in part by tapered wall 272 and straight wall 274.

Figure 17:
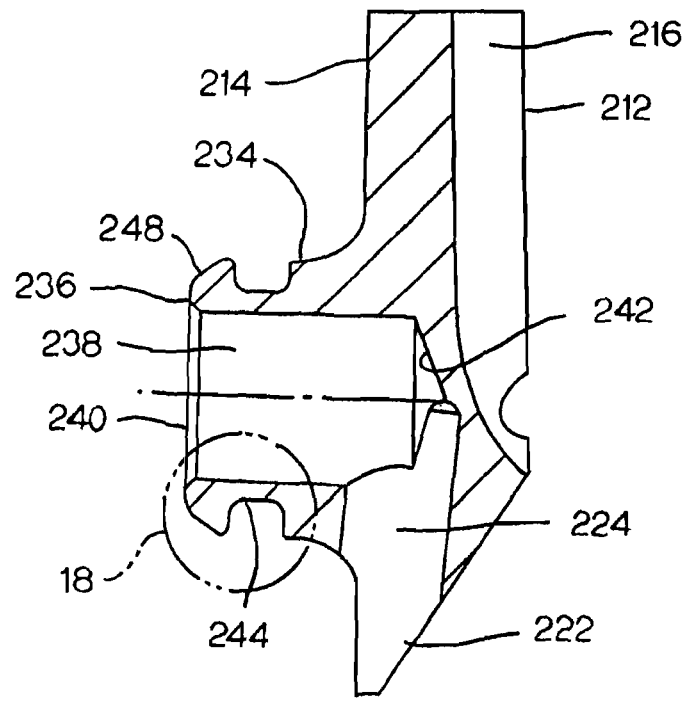
FIG. 17 is a cross-sectional view of the diverter plate of FIG. 12 taken along section line 17-17 of FIG. 14.

As illustrated in FIG. 17, the central boss bore 238 is in fluid communication at its upper end 242 with the interior passage 224. Although the coolant delivery will be described hereinafter, coolant travels (flows) from the bottom end 240 through the central boss bore 238 and exits the central boss bore 238 via the upper end 242 thereof into the interior passage 224. The interior passage 224 opens at the notch 222 whereby coolant sprays out of the interior passage 224 and through the notch 222 toward the cutting insert. As will be described hereinafter, coolant travels along the surface of the cutting insert so as to spray on the cutting insert-workpiece interface.

Figure 20:
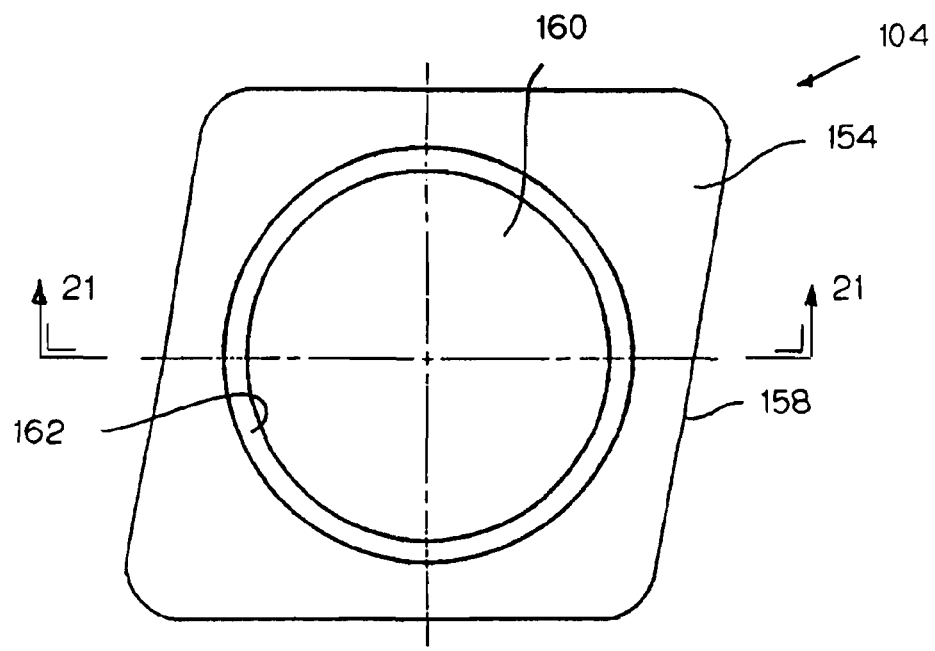
FIG. 20 is a top view of the shim.
Figure 21:
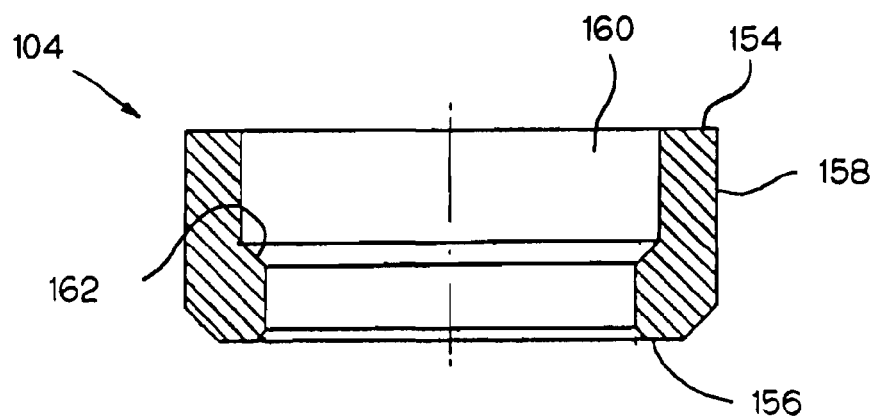
FIG. 21 is a cross-sectional view of the shim of FIG. 20 taken along section line 21-21 of FIG. 20.
Figure 22:
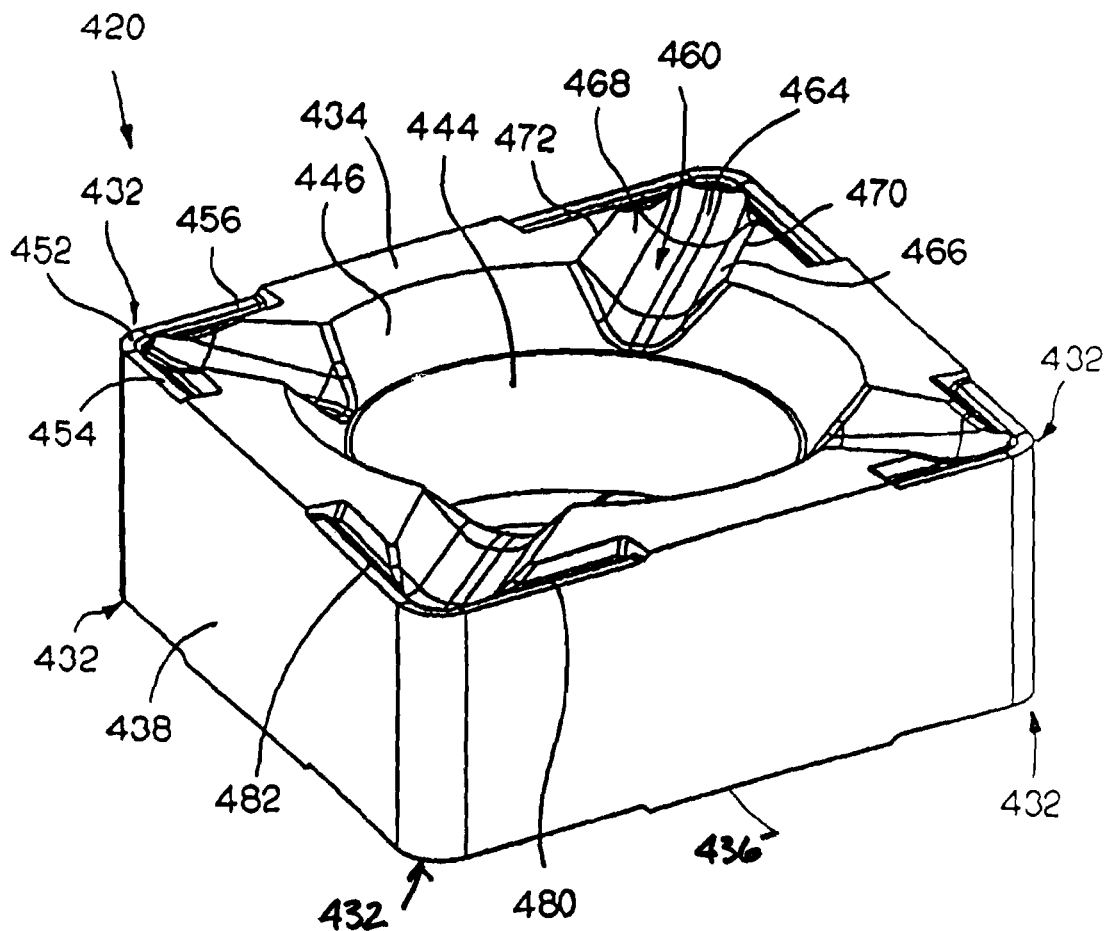
FIG. 22 is an isometric view of a specific embodiment of a roughing cutting insert.

Referring to FIGS. 20 and 21 as well as other appropriate drawings, the shim 104 has a generally polygonal geometry with a top surface 154, a bottom surface 156, and a flank surface 158. The shim 104 contains a central aperture 160 passing completely through the shim 104. The central aperture 160 has an annular lip 162 mediate the top surface 154 and the bottom surface 156 wherein the annular lip 162 projects into the volume of the central aperture 160. Annular lip 162 has a generally frusto-conical surface in cross-section.

As will be described in more detail hereinafter, the annular lip 162 provides a surface against which a resilient O-ring seal 188 deforms under compression to create a fluid-tight seal between the shim 104 and the locking pin 106. There should be an appreciation that the shim 104 may contain or cooperate with other structure, which performs the sealing function. Applicants do not contemplate that the resilient O-ring seal 188 is the only way to create the fluid-tight seal between the shim 104 and the locking pin 106.

Referring to FIG. 19 as well as other appropriate drawings, the clamp assembly 110 includes the screw 112, which has an upper end 280 and a lower end 282. The screw 112 has a head portion 284 and a threaded section 286. The clamp assembly 110 further includes the arm 114. The arm 114 has a proximate end 300 and a distal end 302. The arm 114 also has a base section 304, which contains an aperture 306, adjacent to the proximate end 300. The base section 304 also has a cylindrical section 305. The screw 112 is rotatable within the aperture 306 of the base section 304. The clamp assembly 110, which attaches to the holder and engages the cutting insert, further has a diverter plate 116. The head portion 284 has a pair of spaced-apart prongs 288 that extend outwardly toward the cutting insert when the components are in the assembled condition. The prongs 288 have a generally inward bias. The prongs 288 engage the diverter plate 116 to retain the diverter plate 116 to the clamp arm 114.

FIGS. 22-26 illustrate the roughing cutting insert 420. Referring to FIGS. 22-26, the roughing insert 420 has a roughing cutting insert body 430 with a diamond-shaped geometry having eight discrete corner cutting regions 432. The roughing insert body 430 has a pair of opposite rake faces 434, 436 and a flank face 438, which extends about the periphery of the roughing insert body 430. The flank face 438 intersects the rake faces 434, 436 to form cutting edges 440 at the corner cutting regions 432. One opposite pair of corner cutting regions 432 (upper right hand corner and lower left hand corner as viewed in FIG. 23) has an included angle "AAA" equal to about 80°. The other opposite pair of corner cutting regions 432 (upper left hand corner and lower right hand corner as viewed in FIG. 23) has an included angle "BBB" equal to about 100°. The structural features including the surfaces are essentially the same for each corner cutting region 432.

The roughing insert body 430 contains a central aperture 444 that passes through the roughing insert body 430 whereby the central aperture 444 intersects both rake faces (434, 436). The central aperture 444 has a mouth (446, 448) at each one of the intersections with the rake faces (434, 436). There is a peripheral edge 450 that extends about the corner cutting region 432. The peripheral edge 450 is below and parallel to the rake face plane. FIG. 26 shows that the peripheral edge 450 is a distance "D" below the rake face plane, i.e., a plane that passes along the rake face. The peripheral edge 450 has a central peripheral edge region 452 and a pair of lateral peripheral edge regions 454, 456 that extend away from the central peripheral edge region 452. The corner cutting region 432 may comprise all of or a part of the peripheral edge 450, depending upon the specific cutting operation. The corner cutting region 432 typically includes the central peripheral edge region 452.

At each corner cutting region 432 is a radial coolant trough 460. The radial coolant trough 460 has a radial inward end 462 that opens into the central aperture 444. The radial coolant trough 460 has an arcuate bottom surface 464 and lateral flat side surfaces 466, 468 that terminate in lateral side edges 470, 472, respectively. The radial coolant trough 460 has a radial outward end 478 that terminates at a central notch 484 between the radial coolant trough 460 and the central peripheral edge 452. A lateral topographic region is along each lateral side edge of the radial coolant trough.

There is a pair of peripheral notches 480, 482 that run along and are inside of the lateral peripheral edges 454, 456, except that the peripheral notches 480, 482 terminate at their intersection with the radial coolant trough 460. These peripheral notches 480, 482 are parallel to the rake face plane. For this cutting insert, it is apparent that the radial coolant trough has an origin proximate to the central cutting insert aperture and a termination proximate to and spaced radially inward from the corner cutting edge region. The radial coolant trough has a depth decreasing from the origin to the termination. The coolant when exiting the radial coolant trough travels in an upward direction away from the rake surface.

More specifically, to assemble the diverter plate 116 to the clamp arm 114, the diverter plate 116 is positioned in alignment with the prongs 288. The tapered walls (268, 272) adjacent the rear end 260 engage the prongs 288 to spread them apart as the diverter plate 116 moves toward the cylindrical member 305. The prongs 288 bias inward toward the diverter plate 116 and are within the lateral grooves (264, 266). The inward bias of the prongs 288 securely retains the diverter plate 116 to the clamp arm 114. As one can appreciate, the diverter plate 116 can be detached from the clamp arm 114 by pulling the diverter plate 116 away from the base 304.

By providing a diverter plate that easily attaches to the remainder of the clamp assembly, the material from which the diverter plate is made can vary, depending upon the cutting application. For example, the diverter plate 116 can be made of steel or carbide, depending upon the specific application. The capability to vary only the material of the diverter plate without changing the remainder of the clamping assembly provides an advantage. Another advantage associated with a diverter plate that easily attaches to the remainder of the clamp assembly is that the structure or geometry of the diverter plate can vary to suit a particular situation or application.

Referring to FIG. 28 through FIG. 35, there is illustrated a second specific embodiment of the diverter plate 500. The diverter plate 500 that has a main diverter plate body 502. The main diverter plate body 502 has a top surface 504 and a bottom surface 506. The top surface 504 has a level portion 508 in which there is an axial groove 510. The main diverter plate body 502 further contains a transverse groove 512 at the juncture between the level portion 508 and a sloped portion that has a central sloped flat surface 516 and two lateral sloped surfaces 518, 520. The main diverter plate body 502 further has an arcuate forward surface 522 wherein two converging passages 528, 530 open at the arcuate forward surface 522.

Converging passage 528 has an entrance 534 and an exit 536. Converging passage 530 has an entrance 538 and an exit 540.

Diverter plate 500 further has an integral boss 542 that depends away from the bottom surface 506 of the main diverter plate body 502. The boss 542 has a distal end 544 at which there is a frusto-conical surface 546. The boss 542 further contains a central boss bore 548 that has a bottom end 550 and an upper end 552. The exterior surface of the integral boss 542 contains an annular groove 554 that carries an O-ring seal 556. The main diverter body 502 further has side surfaces (558, 560) that extend from their respective lateral sloped surfaces (518, 520), respectively, to the rear end surface 562 of the main diverter body 502. Each side surface 558, 560 contains a lateral groove 564, 566, respectively. Lateral groove 564 is defined a part by a tapered wall 568 and a straight wall 570. Lateral groove 566 is defined in part by tapered wall 572 and straight wall 574.

Figure 34:
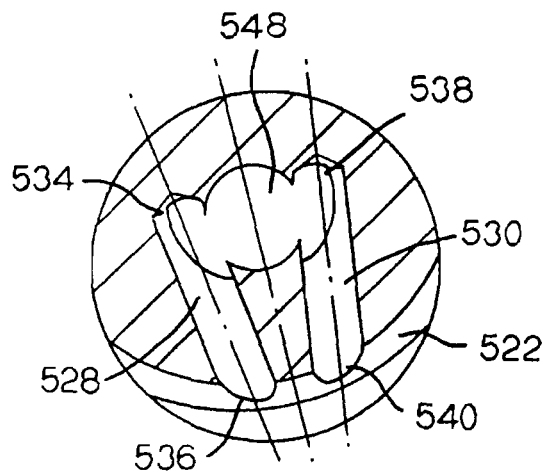
FIG. 34 is a cross-sectional view of a portion of the diverter plate of FIG. 31 taken along section line 34-34 of FIG. 31.
Figure 35:
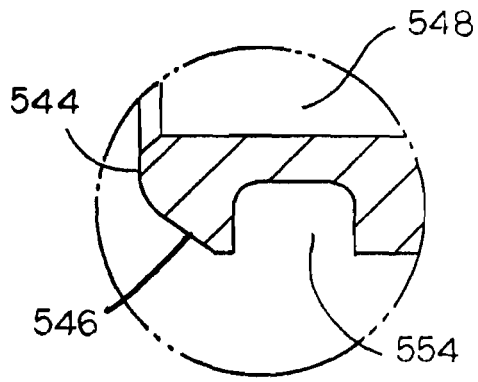
FIG. 35 is an enlarged view of the region of the diverter plate shown in the circle 35 of FIG. 33.
Figure 33:
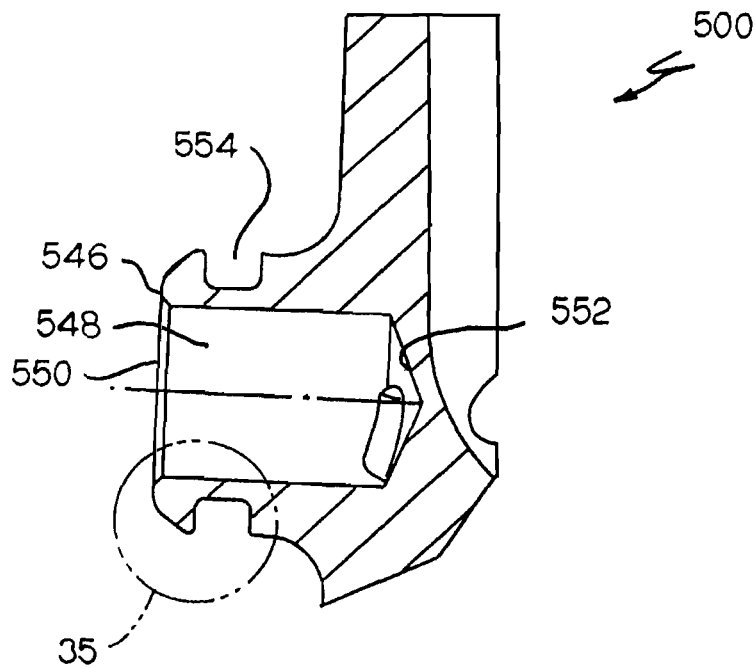
FIG. 33 is a cross-sectional view of the diverter plate of FIG. 30 taken along section line 33-33 of FIG. 30.

As illustrated especially in FIG. 31 and FIG. 34, the central boss bore 548 is in fluid communication at its upper end 552 with the converging passages 528, 530. In reference to the coolant delivery, coolant travels (flows) from the bottom end 550 through the central boss bore 548 and via the upper end 552 into the converging passages 528, 530. The converging passages 528, 530 open at their respective exists (536, 540) whereby coolant sprays out of the converging passages 528, 530 toward the cutting insert wherein coolant flows along the surface of the cutting insert to spray at the cutting insert-workpiece interface.

Figure 7:
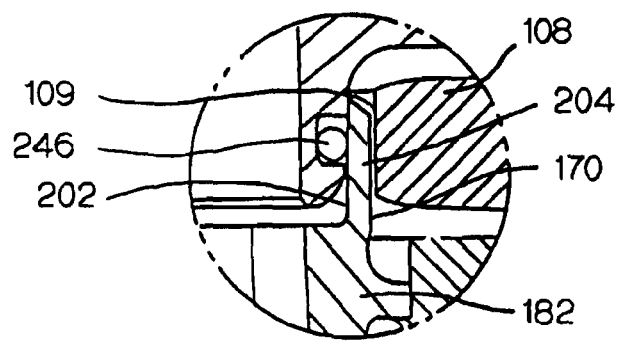
FIG. 7 is an enlarged view of the region of FIG. 6 in circle 7 of FIG. 6.
Figure 8:
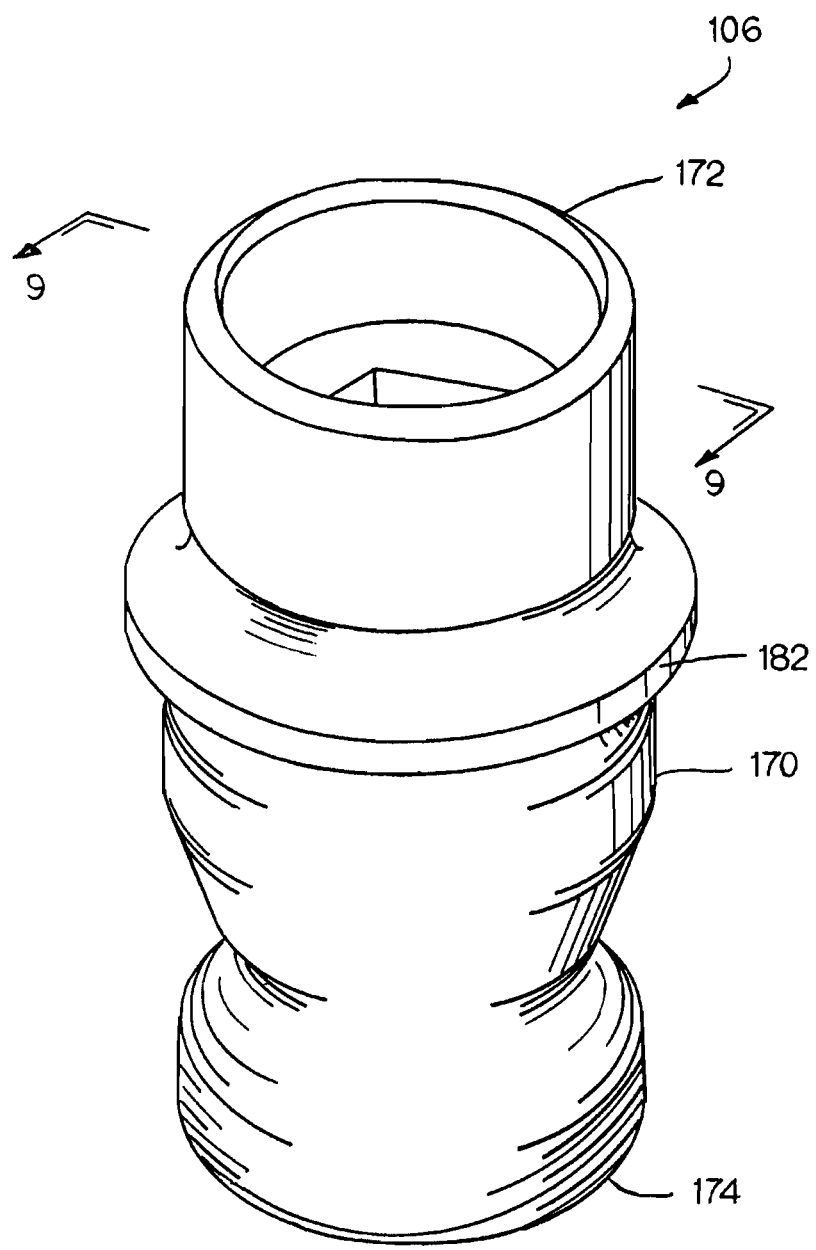
FIG. 8 is an isometric view of a specific embodiment of the locking pin.
Figure 10:
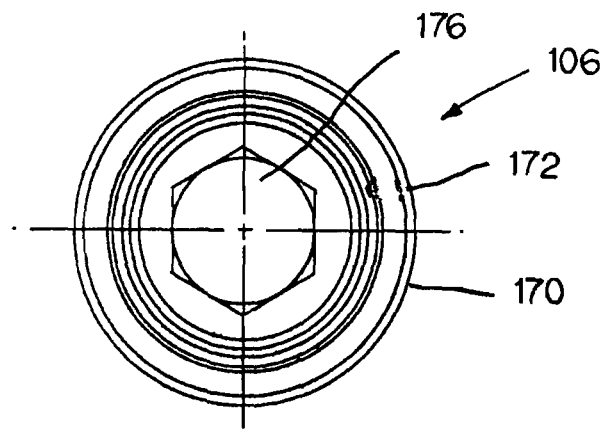
FIG. 10 is a top view of the locking pin of FIG. 8.
Figure 11:
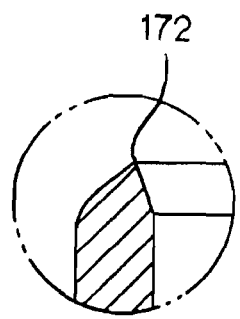
FIG. 11 is an enlarged view of the region of the locking pin in circle 11 of FIG. 9.
Figure 9:
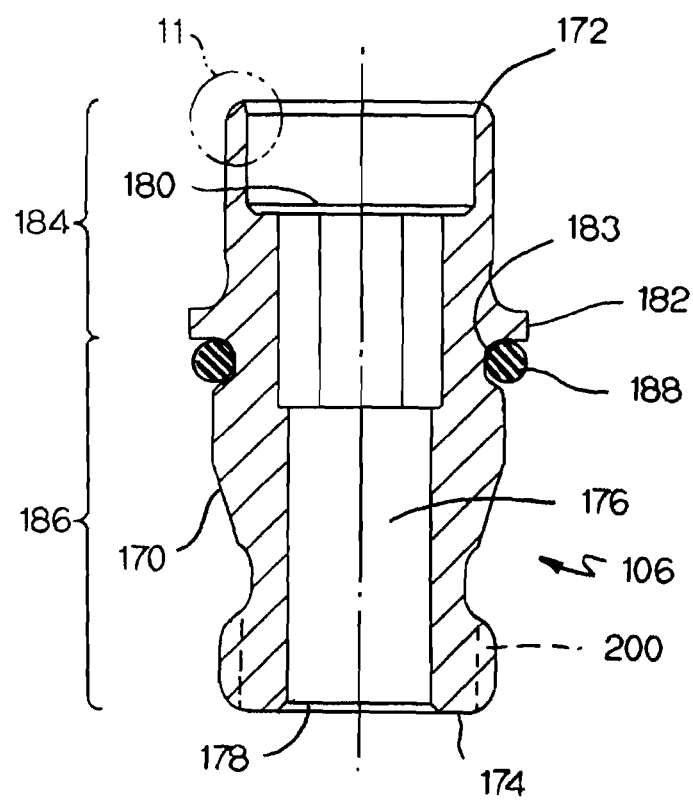
FIG. 9 is a cross-sectional view of the locking pin of FIG. 8 taken along section line 9-9 of FIG. 8.
Figure 12:
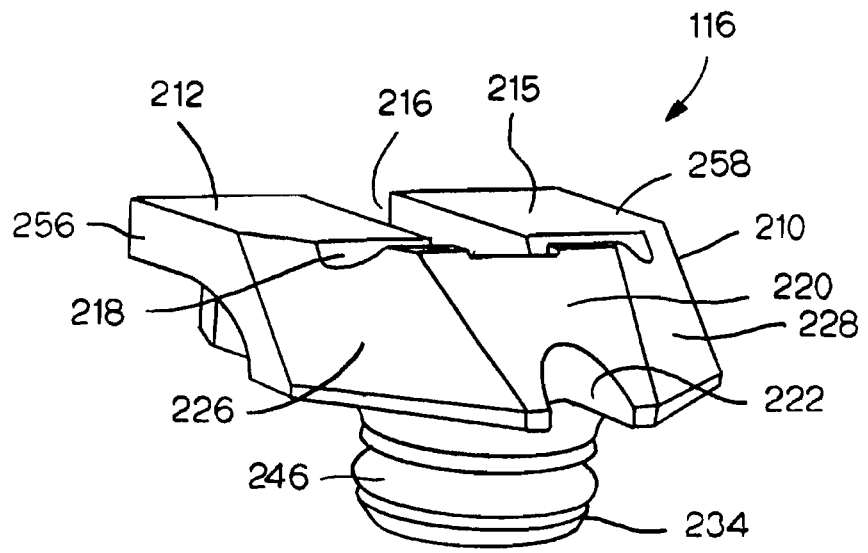
FIG. 12 is an isometric view of a specific embodiment of the diverter plate.
Figure 13:
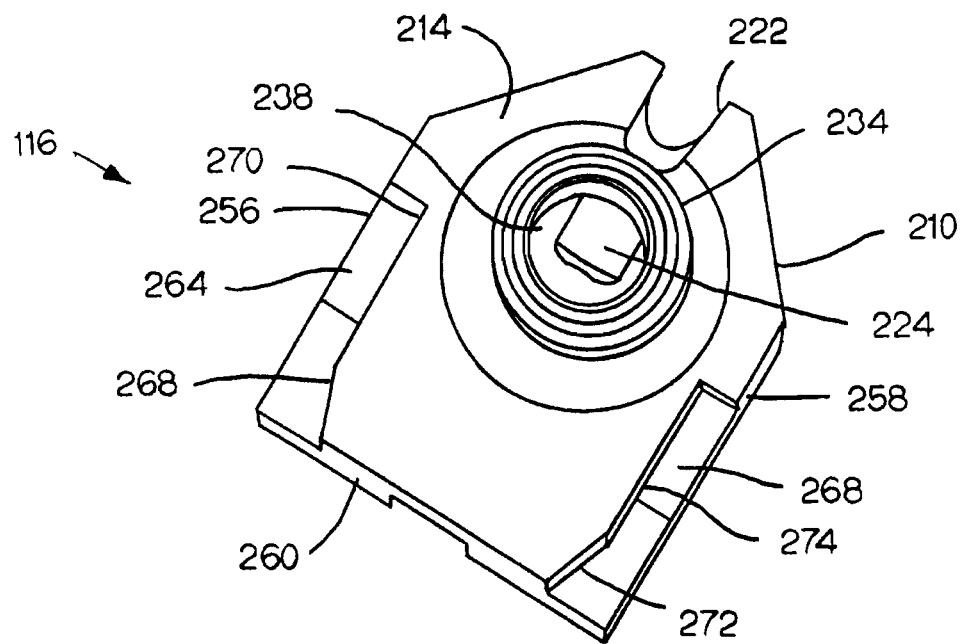
FIG. 13 is a bottom isometric view of the diverter plate of FIG. 12.
Figure 18:
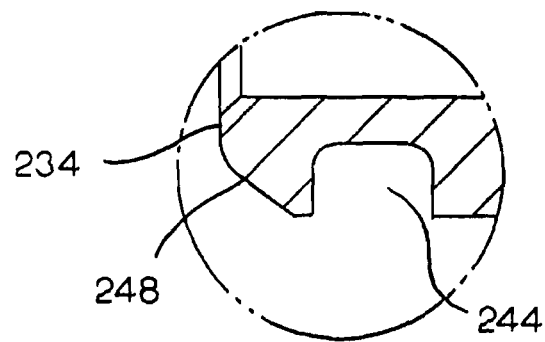
FIG. 18 is an enlarged view of the region of the diverter plate in circle 18 of FIG. 17.
Figure 27:
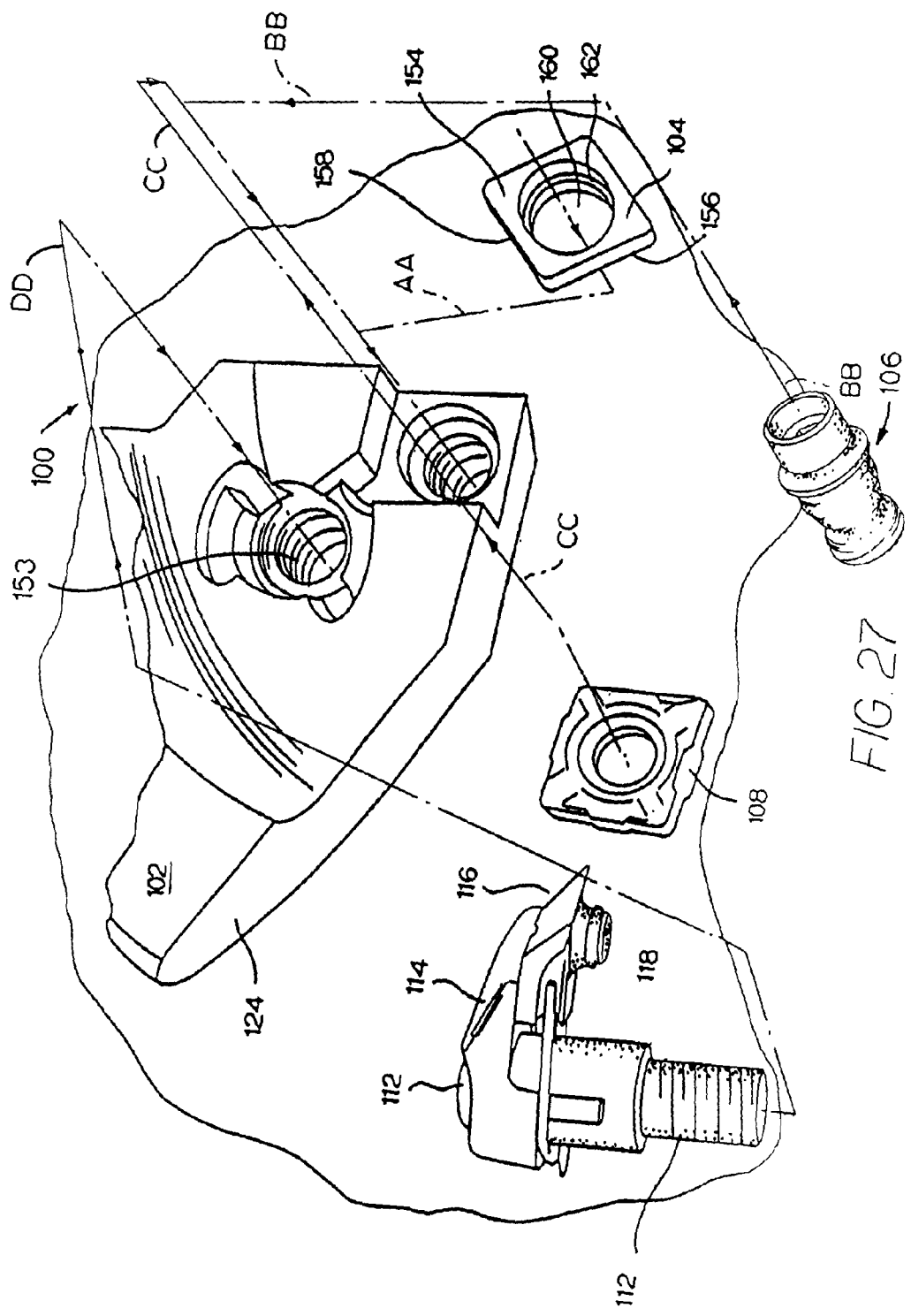
FIG. 27 is an isometric view showing the assembly of the cutting insert assembly to the holder body.

Referring to the assembly of the components, FIG. 27 provides a visual guide to the assembly of the components, and FIGS. 6 and 7 show the assembled components in cross-section. Initially, the shim 104 is positioned on the seating surface 138 of the seat 136 in the holder 102. The flank surfaces 158 of the shim 104 adjacent the upstanding wall 140 contact the surface of the wall 140. Arrow AA represents this step in the assembly process.

As the next step, the locking pin 106 is inserted into the outlet 146 of the coolant delivery passage 142 in the seating surface 138. The threaded region 200 of the locking pin 106 threadedly engages the threaded section 148 of the coolant delivery passage 142. The locking pin 106 is threaded until it is tightly secured in the coolant delivery passage 142. As is apparent, at least a part of the locking pin 106 is in the coolant delivery passage 142. The locking pin 106 tightly secures shim 104 to the seating surface of the seat. Arrows BB represent this step in the assembly process.

As the next step, the cutting insert 108 is positioned on top of the shim 104. When in this position, the upper portion 204 of the locking pin 106 is at least within some of the central aperture 109 of the cutting insert 108. Arrows CC represent this step in the assembly process.

There should be an appreciation that once the locking pin 106 is securely affixed in the coolant delivery passage 142, the rearward surface of the shoulder 182 compresses the O-ring 188 against the lip 162 of the shim 104. The O-ring 188 creates a fluid-tight seal between the locking pin 106 and the shim 104. During operation, coolant cannot escape between the shim 104 and locking pin 106.

The next step in the assembly process comprises attaching the clamp assembly 110 to the holder 102. The threaded section 286 of the screw 112 threadedly engages the threaded clamp bore 153 in the holder 102. The clamp assembly 110 is tightened down into position where it retains the cutting insert 108 in position on top of the shim 104.

When in the securely tight position, the seal 246 on the diverter plate 116 compresses against the interior wall 202 of the upper portion 204 of the locking pin 106. The result is a fluid-right seal between the diverter plate 116 and the locking pin 106. It becomes apparent that there is a fluid-tight seal between the locking pin and the coolant delivery passage as described above. It is also apparent that there is a fluid-tight seal between the locking pin and the shim as described above. It is also apparent that there is a fluid-tight seal between the locking pin and the diverter plate as described above. At this stage in the assembly process, the cutting assembly is ready to perform in an operation for chipforming removal of material from a workpiece.

In operation, the coolant, which is typically under pressure, enters the coolant delivery passage 142 via the one end 144. Coolant travels through the coolant delivery passage 142 towards the seating surface 138. The locking pin 106 is threaded fully into the coolant delivery passage 142 adjacent the other end 144 thereof. When in this condition, the axial bottom end 174 of the locking pin 106 is located into the coolant delivery passage 142. Coolant enters through the inlet 178 into the longitudinal bore 176 of the locking pin 106. Coolant flows through the longitudinal bore 176 and exits through the outlet 180 into the central boss bore 238 and then into passage 224 of the diverter plate 116. Coolant sprays out of the passage 224 into the radial coolant trough of the cutting insert. The coolant spray travels in a direction upward and outward from the radial coolant trough in the rake surface of the cutting insert. The coolant spray impinges the underneath surface of the chip formed from the workpiece during the cutting operation.

Figure 36:
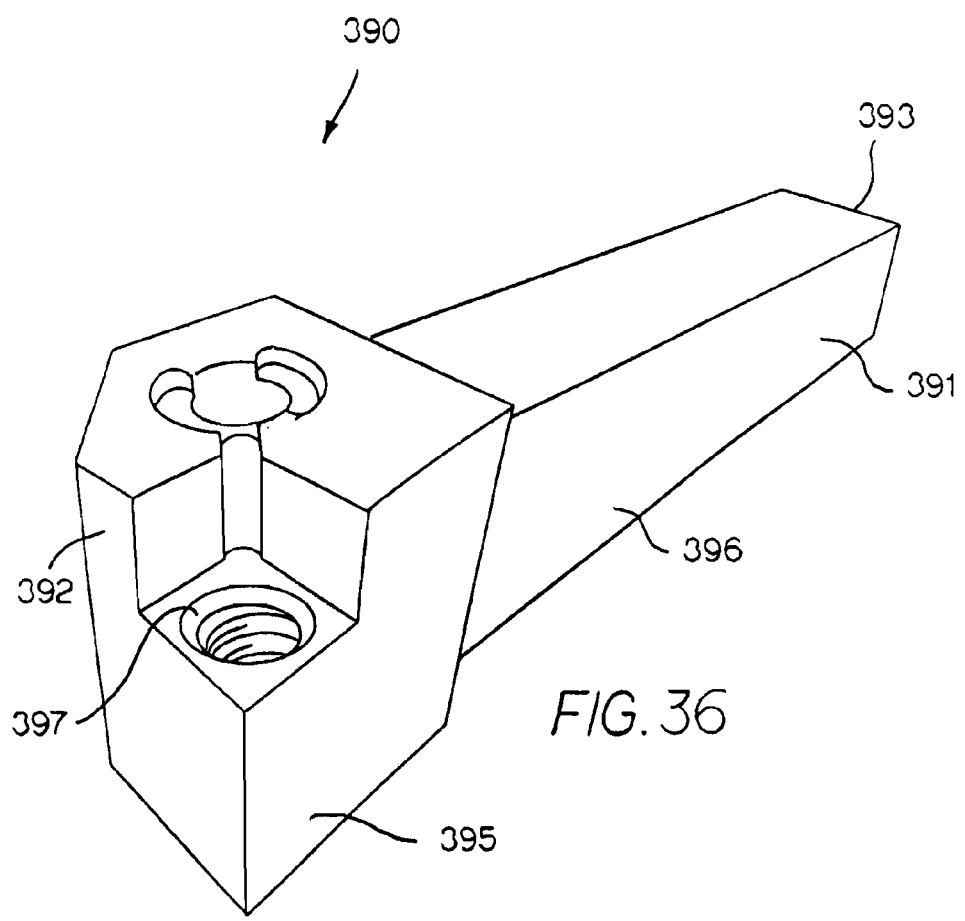
FIG. 36 is an isometric view of another embodiment of a holder suitable to receive the cutting insert assembly.
Figure 36A:
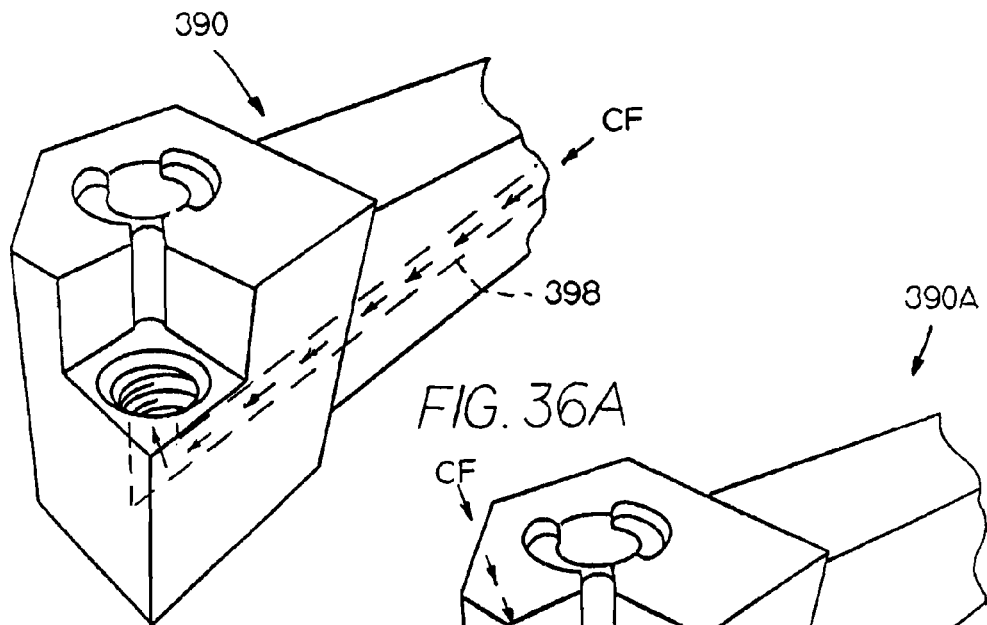
FIG. 36A is an isometric view of a holder like that of FIG. 36 with the internal coolant passage entering the holder from the rear and traveling along the elongate shank.

FIG. 36 is an isometric view of another embodiment of a holder suitable to receive the cutting insert assembly. This holder 390 has a holder body 391 with opposite axial forward end 392 and an axial rearward end 393. A shank 396 is adjacent the rearward end 393 and a head 395 is adjacent the forward end 392. There is a coolant port 397 in the seating portion of the head 395. FIG. 36A shows the coolant delivery passage 398 that enters from the rearward end of the holder body and extends all along the length thereof.

Figure 36B:
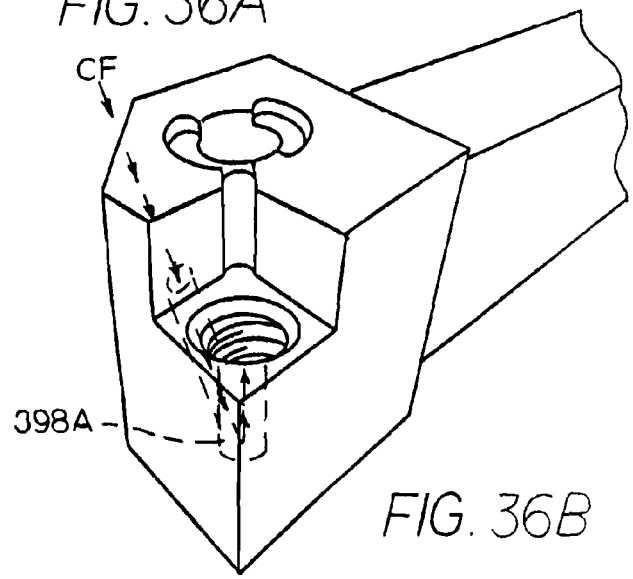
FIG. 36B is an isometric view of a holder like that of FIG. 36 with the internal coolant passage entering the holder from the side and traveling in the head of the holder.
Figure 36C:
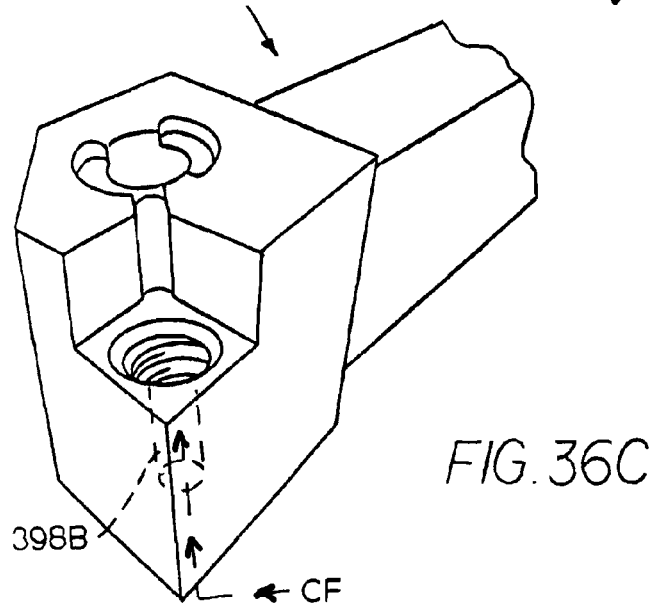
FIG. 36C is an isometric view of a holder like that of FIG. 36 with the internal coolant passage entering the holder from the bottom and traveling in the head of holder.

FIG. 36B is an isometric view of a holder 390A like that of FIG. 36, but with the internal coolant passage 398A entering through the bottom of the holder. FIG. 36C is an isometric view of a holder 390B like that of FIG. 36, but with the internal coolant passage 398B entering through the bottom surface of the holder. There is an appreciation that the coolant delivery passage can enter into the holder in any one of a number locations, e.g., rear, side and bottom.

It is apparent that the present invention provides a cutting assembly, as well as a cutting insert assembly, to facilitate enhanced delivery of coolant adjacent the interface between the cutting insert and the workpiece (i.e., the insert-chip interface). By doing so, there is a diminishment of excessive heat at the insert-chip interface in the chipforming removal of material from a workpiece. By providing coolant flow, there is a reduction in excessive heat at the insert-chip interface to eliminate or reduce build up of chip material. By providing the flow of coolant to the insert-chip interface, the evacuation of chips from the insert-chip interface will be facilitated thereby minimizing the potential that a chip will be re-cut. It is apparent the present invention provides advantages connected with decreasing the heat at the insert-chip interface The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting assembly for use in an operation for chipforming removal of material from a workpiece, the cutting assembly comprising:
   a holder having a seat;
   the holder containing a coolant delivery passage;
   a locking pin having a longitudinal locking pin bore, the locking pin being affixed to the seat so the longitudinal locking pin bore being in communication with the coolant delivery passage;
   a cutting insert having a central cutting insert aperture;
   at least a portion of the locking pin being within the central cutting insert aperture;
   a clamp assembly being attached to the holder and engaging the cutting insert, and the clamp assembly having a diverter plate, the diverter plate having a bottom surface, an integral boss depending away from the bottom surface of the diverter plate, the integral boss containing a central boss bore, the diverter plate containing an interior passage wherein the central boss bore is in communication with the interior passage; and
   the longitudinal locking pin bore opening to the central boss bore whereby coolant flows into the central boss bore and to the interior passage exiting the interior passage toward the cutting insert.

2. The cutting assembly according to claim 1 further comprising a shim being received within the seat, and the locking pin engaging the shim to secure the shim to the holder at the seat.

3. The cutting assembly according to claim 2 wherein the locking pin carrying an O-ring seal, and the O-ring seal providing a fluid-tight seal between the locking pin and the shim.

4. The cutting assembly according to claim 1 wherein the radial coolant trough having an origin proximate to the central cutting insert aperture and a termination proximate to and spaced radially inward from the corner cutting edge region, the radial coolant trough having a depth decreasing from the origin to the termination.

5. The cutting assembly according to claim 4 wherein coolant exiting the radial coolant trough travels in an upward direction away from the rake surface.

6. The cutting assembly according to claim 1 wherein the longitudinal locking pin bore having an upper portion defined by an upper interior wall, and the integral boss carrying a boss seal; and at least a portion of the integral boss extending into the upper portion of the longitudinal locking pin bore whereby the boss seal seals against the upper interior wall forming a fluid-tight seal between the diverter plate and the locking pin.

7. The cutting assembly according to claim 1 wherein the diverter plate containing a second interior passage in communication with the central boss bore whereby coolant flows into the central boss bore and to the second interior passage exiting the second interior passage toward the cutting insert.

8. The cutting assembly according to claim 7 wherein the interior passage and the second interior passage converge toward each other.

9. The cutting insert according to claim 7 wherein the interior passage and the second interior passage are distinct from each other.

10. The cutting insert assembly according to claim 1 wherein the diverter plate further containing a notch, and the interior passage opening at the notch.

11. The cutting insert assembly according to claim 1 wherein the integral boss extending into at least a part of the longitudinal locking pin bore, the integral boss carrying a resilient seal, and the resilient seal providing a fluid-tight seal between the diverter plate and the locking pin.

12. A locking pin-diverter plate assembly for use with a holder having a coolant delivery passage, a cutting insert, and a clamp, the locking pin-diverter plate assembly comprising:
 a locking pin containing a longitudinal locking pin bore having a coolant inlet and a coolant outlet, the longitudinal locking pin bore having an upper portion defined by an upper interior wall;
 a diverter plate having a bottom surface with an integral boss depending away from the bottom surface of the diverter plate, the integral boss having a central boss bore, the diverter plate containing an interior passage in communication with the central boss bore; and
 the longitudinal locking pin bore opening to the diverter plate whereby coolant flows into the central boss bore and to the interior passage exiting the interior passage toward the cutting insert.

13. The locking pin-diverter plate assembly according to claim 12 wherein the longitudinal locking pin bore having an upper portion defined by an upper interior wall, and the integral boss carrying a boss seal; and at least a portion of the integral boss extending into the upper portion of the longitudinal locking pin bore whereby the boss seal seals against the upper interior wall forming a fluid-tight seal between the diverter plate and the locking pin.

14. The locking pin-diverter plate assembly according to claim 12 wherein the diverter plate containing a second interior passage in communication with the central boss bore whereby coolant flows into the central boss bore and to the second interior passage exiting the second interior passage toward the cutting insert.

15. The locking pin-diverter plate assembly according to claim 14 wherein the interior passage and the second interior passage converge toward each other.

16. A cutting assembly for use in an operation for chip-forming removal of material from a workpiece, the cutting assembly comprising:
 a holder having a seat and containing a coolant delivery passage;
 a locking pin having a longitudinal locking pin bore in communication with the coolant delivery passage;
 a cutting insert;
 a clamp assembly being attached to the holder and engaging the cutting insert, and the clamp assembly having a diverter plate with an integral boss containing a central boss bore, the diverter plate containing an interior passage wherein the central boss bore is in communication with the interior passage; and
 the integral boss extending into at least a part of the longitudinal locking pin bore, the integral boss carrying a resilient seal, and the resilient seal providing a fluid-tight seal between the diverter plate and the locking pin, the longitudinal locking pin bore opening to the central boss bore whereby coolant flows into the central boss bore and to the interior passage exiting the interior passage toward the cutting insert.

17. The cutting assembly according to claim 16 further comprising a shim being received within the seat, and the locking pin engaging the shim to secure the shim to the holder at the seat.

18. The cutting assembly according to claim 17 wherein the locking pin carrying an O-ring seal, and the O-ring seal providing a fluid-tight seal between the locking pin and the shim.

* * * * *